United States Patent
Unruh

(10) Patent No.: US 10,305,687 B2
(45) Date of Patent: May 28, 2019

(54) VERIFICATION SYSTEM AND METHOD

(71) Applicant: QuBalt GmbH, Neumuenster (DE)

(72) Inventor: Dominique Unruh, Tartu (EE)

(73) Assignee: QUBALT GMBH, Neumuenster (DE)

( * ) Notice: Subject to any disclaimer, the term of this patent is extended or adjusted under 35 U.S.C. 154(b) by 214 days.

(21) Appl. No.: 15/117,717

(22) PCT Filed: Feb. 10, 2015

(86) PCT No.: PCT/EP2015/052793
§ 371 (c)(1),
(2) Date: Aug. 9, 2016

(87) PCT Pub. No.: WO2015/118179
PCT Pub. Date: Aug. 13, 2015

(65) Prior Publication Data
US 2016/0359623 A1    Dec. 8, 2016

(30) Foreign Application Priority Data

Feb. 10, 2014    (GB) .................................. 1402275.0

(51) Int. Cl.
*H04L 9/08*    (2006.01)
*H04L 9/32*    (2006.01)

(52) U.S. Cl.
CPC .......... *H04L 9/0852* (2013.01); *H04L 9/0858* (2013.01); *H04L 9/3271* (2013.01)

(58) Field of Classification Search
None
See application file for complete search history.

(56) References Cited

U.S. PATENT DOCUMENTS

2002/0025041 A1*  2/2002  Tomita .................. H04L 9/0662
                                                            380/256
2012/0195597 A1*  8/2012  Malaney ............... H04L 9/0852
                                                            398/115

FOREIGN PATENT DOCUMENTS

WO    WO-2011/044629 A1    4/2011

OTHER PUBLICATIONS

Lau, H.K., and Lo, H.K. "Insecurity of Position-Based Quantum Cryptography Protocols Against Entanglement Attacks". Rev. ed. Sep. 21, 2010, arXiv.org, Cornell University Library, Ithaca, NY, XP80448484, arXiv:1009.2256v3 [quant-ph], pp. 1-13.

(Continued)

*Primary Examiner* — William J. Goodchild
(74) *Attorney, Agent, or Firm* — Haley Guiliano LLP; Alex Shvarts; Andrew Lee

(57) ABSTRACT

A method is provided for a verifying system to verify a location of a target apparatus. The method comprises transmitting a plurality of signals from two or more of a plurality of communication devices of the verifying system to the target apparatus, each signal of the plurality of signals comprising information. The method further comprises sending quantum information to the target apparatus via a quantum communication channel, wherein a plurality of bits is encoded in the quantum information and the encoding of the plurality of bits is based on an output of a function of the information associated with the plurality of signals. The method further comprises receiving a response related to the plurality of bits at two or more of the plurality of communication devices. The method further comprises analyzing the response, the plurality of bits encoded in the quantum information, and a time between the transmitting of the plurality of signals and the receiving of the response. The method further comprises determining from the analyzing (Continued)

whether or not the response originated from the location of the target apparatus.

18 Claims, 15 Drawing Sheets

(56) References Cited

OTHER PUBLICATIONS

Buhrman, H. et al. "Position-Based Quantum Cryptography: Impossibility and Constructions". Rev. ed. Aug. 12, 2011, arXiv.org, Cornell University Library, Ithaca, NY, XP80448689, arXiv:1009.2490v4 [quant-ph], pp. 1-27.

Tomamichel, M. et al. "One-Sided Device-Independent QKD and Position-Based Cryptography From Monogamy Games" in: Advances in Cryptology—EUROCRYPT 2013, May 26, 2013, Springer Berlin Heidelberg, pp. 609-625.

Unruh, D. "Quantum Position Verification in the Random Oracle Model" in: Advances in Cryptology—CRYPTO 2014, Part II, LNCS 8617, Aug. 17, 2014, Springer Berlin Heidelberg, pp. 1-18.

International Search Report and Written Opinion of the International Searching Authority for application No. PCT/EP2015/052793, dated Jun. 5, 2015.

\* cited by examiner

VERIFICATION SYSTEM AND METHOD

CROSS-REFERENCE TO RELATED APPLICATIONS

This application is a United States National Phase Application filed under 35 U.S.C. § 371 from International Patent Application No. PCT/EP2015/052793, filed on Feb. 10, 2015, which claims priority to GB Patent Application No. 1402275.0, filed on Feb. 10, 2014.

TECHNICAL FIELD

The present disclosure relates to the field of position verification systems and methods. In particular, the present disclosure relates to position verification systems and methods utilising quantum communication channels.

BACKGROUND

In cryptography, a party will typically possess a set of credentials determining its identity, which tasks it can perform, which protocols it can participate in and so on. These credentials will typically correspond to the party in quest ion having some secret information such as a secret key or another exclusive method of authentication. Yet another credential of the party could be the geographical location of the party.

The geographical location of the party is valuable in a number of settings. For example a first party might want to send a message having some classified information in such a way that it can only be read by a second party present at a specific location. An adversary may try to intercept and decrypt the secret message and so, from the perspective of the first party, it would be desirable to add an additional layer of security that would guarantee that anyone reading the message is physically located at a specific geographic location. In another example, the first party may receive some message purporting to be from a trusted second party situated at a specific geographical location. In order to be sure that the first party has not in fact received a message from a malevolent adversary, it would be desirable for the first party to have a guarantee that the message did indeed originate at the specific geographical location of the trusted second party.

The traditional method of verifying a location of a target is based on calculating a time between a verifying party sending a challenge to the target and receiving a correct reply to the challenge from the target. By utilising multiple spacially-separated verifiers, it is possible to determine a position of the target object by trilateration. However, there are security problems with this traditional approach, as will now be discussed with reference to FIG. 1. FIG. 1 shows an example set-up of a verification system for verifying the location of a target object according to an exemplary prior art system. In this example, the verifying system comprises a first verifier 110, a second verifier 112 and a third verifier 114. The first verifier 110, the second verifier 112 and the third verifier 114 may communicate with each other via a communication channel 116. In order to verify the position of target 120, the first verifier may send a first bit string to the target 120. Similarly, the second verifier may send a second bit string to the target 120 and the third verifier 114 may send a third bit string to the target 120 (see dashed lines). The target 120 may then process the received first, second and third bit strings and send replies to each of the verifiers. On receiving a response from the target 120, each verifier, 110, 112, 114, computes a time between the transmission of their respective bit string and the receipt of the response from the target 120. If each of the verifiers 110, 112 and 114 received an anticipated response within an acceptable timeframe, then the verification system determines that the target object 120 is at the expected location.

However, as can be seen in FIG. 1, an adversary may deploy interceptors between each of the verifiers 110, 112 and 114, and the expected position of the target 120. That is, a first interceptor 130 may be deployed between the first, verifier 110 and the expected position of the target 120, a second interceptor 132 may be deployed between the second verifier 112 and the expected position of target object 120, and a third interceptor 134 may be deployed between the third verifier 114 and the expected position of target object 120. Each of the interceptors 130, 132, 134 is assumed to be in communication with the other interceptors via communication channels 136. In the presence of these interceptors 130, 132, 134, any bit strings sent to the expected position of target 120 from the verifiers 110, 112, 114, may be intercepted by the interceptors 130, 132, 134. Due to the geometry of the setup in FIG. 1, the first, second and third bit strings from the verifiers 110, 112 and 114 can be shared and processed by the interceptors 130, 132 and 134 in sufficient enough time to compute the anticipated response and reply within the acceptable time frame. Accordingly, there is a risk that a response received by the verification system has in fact originated at one or more of the interceptors 130, 132 and 134. If this is the case then the position of the target 120 has not in fact been verified and, indeed, the target 120 may not even be located at the expected position. There could therefore be security implications for future messages sent to the expected position of the target object.

The present disclosure aims to overcome at least some of the problems described above by providing a truly secure method of verifying the position of a target. The invention described herein is, at least in part, based on quantum mechanics, quantum information and quantum computation. For the interested reader, the fundamentals of these fields are detailed in "Quantum Computation and Quantum Information" by Michael A Nielsen and Isaac L Chuang. In particular, this reference contains information concerning properties of qubits and the basics of quantum measurements in complementary bases. This reference also familiarises readers with notations conventionally used in the field of quantum physics.

SUMMARY

A simple application of position verification is for a device to prove that it is at a particular location to access a service. In a more advanced setting, location can be used for authentication: a prover can send a message which is guaranteed to have originated within a particular region (position-based authentication, PBA). Finally, when combining PBA with quantum key distribution (QKD), an encrypted message can be sent in such a way that only a recipient at a certain location can decrypt it. For example, if a first party wants to send a message to a second party at an expected location, the first party can ensure that the message is only received at the expected location of the second party.

In what follows, position verification and PBA schemes are disclosed that are secure against colluding interceptors and do not need to rely on assumptions of how much information, classical or quantum, can be stored or retrieved by the colluding interceptors. The protocols use quantum cryptography and are proven secure in the (quantum) random oracle model. The protocols are applicable in a three-dimensional setting. In fact, the protocols are applicable in any number of spacial dimensions, as well as in curved space time. This immediately implies a position-based QKD. Additionally, the protocols provide everlasting security, i.e. security is maintained even if after the protocol is used the key is revealed to an adversary or the adversary breaks any of the cryptographic schemes used in the protocol.

In what follows, the terms "communication device" and "verifier" have been and can be used interchangeably, and both terms are used to describe components of a verifying system. The terms "target apparatus" and "prover" have been and can be used interchangeably.

In accordance with an aspect of the invention, a method is provided for a verifying system to verify a location of a target apparatus. The method comprises transmitting a plurality of signals from two or more of a plurality of communication devices of the verifying system to the target apparatus, each signal of the plurality of signals comprising information. The method further comprises sending quantum information to the target apparatus via a quantum communication channel, wherein a plurality of bits is encoded in the quantum information and the encoding of the plurality of bits is based on an output of a function of the information associated with the plurality of signals. The method further comprises receiving a response related to the plurality of bits at two or more of the plurality of communication devices. The method further comprises analysing the response, the plurality of bits encoded in the quantum information, and a time between the transmitting of the plurality of signals and the receiving of the response. The method further comprises determining from the analysing whether or not the response originated from the location of the target apparatus.

The plurality of signals may be transmitted such that each signal arrives at the location of the target apparatus within a time frame. The time frame may be an instant in time.

Transmitting a plurality of signals from two or more communication devices of the verifying system to the target apparatus may comprise, at each of the two or more communication devices, transmitting a signal of the plurality of signals to the target apparatus, and the information associated with the signal may be distinct from information associated with a signal of the plurality of signals transmitted from another communication device of the two or more communication devices.

The associated information may be classical information. For example, the associated information may comprise bit strings.

The sending of quantum information to the target apparatus may comprise sending to the target apparatus, via the quantum communication channel, a plurality of quantum objects, wherein the plurality of bits are encoded in quantum states of the quantum objects. The quantum objects may comprise photons and the quantum states may comprise polarisation states of the photons. The quantum communication channel may comprise a quantum teleportation channel. The quantum communication channel may be associated with one or more of the plurality of communication devices.

The function may be a non-linear function. The function may be a cryptographic hash function. The function may be a composition of functions. Where the function comprises a composition of functions, the composition may contain, as a first component, a linear function and as a second component a non-linear function, so that the image of the linear function is the argument of the non-linear function. In such a scenario, the non-linear function in the composition may be a cryptographic hash function. The linear function in the composition may be a bitwise XOR of its arguments. The linear function may be a group operation, such as an XOR operation, applied to the arguments.

The output of the function of the information associated with the plurality of signals may indicate a basis of measurement for measuring a quantum object. The basis of measurement may be a basis for measuring a polarization state of a photon.

The response may be received from the target apparatus. The response related to the plurality of bits may comprise the plurality of bits. The response related to the plurality of bits may comprise an output of a function of the plurality of bits. The response may comprise additional information. For example, the response may comprise information about how information received at the target apparatus was decoded. The response may be one of a plurality of responses received from the target apparatus.

The analysing may comprise comparing the received response and the plurality of bits encoded in the quantum information. The analysing of a time between the transmitting of the plurality of signals and the receiving of the response may comprise checking that the time is less than a bound.

The function of the information associated with the plurality of signals may be a function of a received message. The determining may include determining whether or not the message was sent from the target apparatus.

In accordance with an aspect of the invention, a verifying system is provided for verifying a location of a target apparatus. The verifying system comprises a plurality of communication devices configured to transmit a plurality of signals to the target apparatus and configured to receive a response. The verifying system further comprises a quantum state transmitter for sending quantum information to the target apparatus via a quantum communication channel. The verifying system further comprises a controller configured to perform any of the methods above.

The quantum state transmitter may be located at a communication device of the plurality of communication devices. The controller may be located at a communication device of the plurality of communication devices. The plurality of communication devices may be configured to communicate with one another via one or more secure communication channels.

In accordance with an aspect of the invention, a computer readable medium is provided, the computer readable medium comprising computer readable code operable, in use, to instruct a computer system to perform any of the methods, or portion(s) of any of the methods, disclosed above.

In accordance with an aspect of the invention, a method is provided for a target apparatus to prove its location to a verifying system. The method comprises receiving from the verifying system, at the target apparatus, a plurality of signals, each signal of the plurality of signals comprising information. The method further comprises receiving quantum information from the verifying system via a quantum communication channel, wherein a plurality of bits is encoded in the quantum information. The method further comprises determining at least a part of the encoding of the encoded plurality of bits based on an output of a function of the information associated with the plurality of signals. The method further comprises decoding a plurality of bits from the communicated quantum information in accordance with the encoding of the encoded plurality of bits. The method further comprises sending a response related to the decoded plurality of bits to two or more of a plurality of communication devices of the verifying system.

Receiving quantum information via the quantum communication channel may comprise receiving a plurality of quantum objects, wherein the plurality of bits is encoded in quantum states of the quantum objects.

Decoding a plurality of bits from the quantum information may comprise measuring a quantum state of one or more of a plurality of quantum objects. The quantum objects may comprise photons and the quantum state may comprise a polarisation state of a photon.

Sending the response related to the decoded plurality of bits to two or more of a plurality of communication devices may comprise sending the response to a determined set, of the plurality of communication devices. The response may comprise the decoded plurality of bits.

The function of the information associated with the plurality of signals may be a function of a message sent to the verifying system. In this way, the target apparatus is advantageously able to authenticate the message sent to the verifying system.

In accordance with an aspect of the invention, a target apparatus is provided. The target apparatus comprises a transceiver for receiving a plurality of signals and for sending a response. The target apparatus further comprises a quantum receiver for receiving quantum information via a quantum communication channel. The target apparatus further comprises a processor for performing the methods disclosed above.

In accordance with an aspect of the invention, a computer readable medium is provided. The computer readable medium comprises computer readable code operable, in use, to instruct a computer system to perform any of the methods, or portion(s) of any of the methods, disclosed above.

In accordance with an aspect of the invention, a system is provided. The system has a memory having computer readable code stored thereon. The system further has a processor arranged, in use, to run the computer readable code to perform any of the methods, or portion(s) of any of the methods, disclosed above.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain example combinations of elements, steps and/or functions, it will be appreciated that different combinations of elements, steps and/or functions may be provided by alternative embodiments without departing from the scope of the invention.

BRIEF DESCRIPTION OF THE DRAWINGS

Exemplary embodiments of the invention shall now be described with reference to the drawings in which.

Throughout the description and the drawings, like reference numerals refer to like parts.

DETAILED DESCRIPTION

Figure 1:
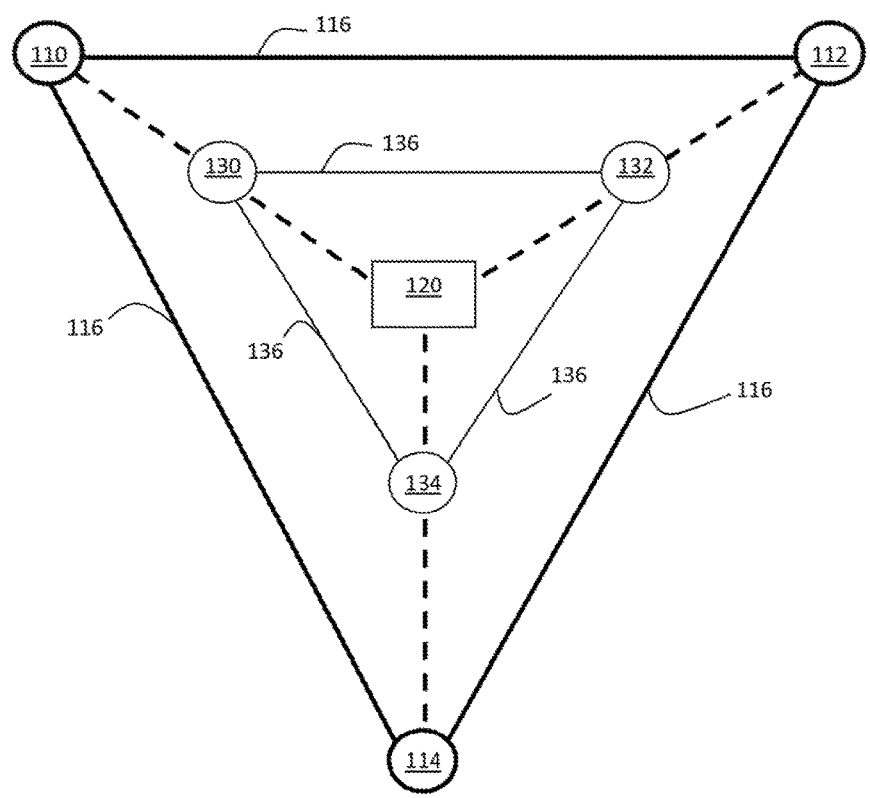
FIG. 1 illustrates a classical position verification system according to the prior art, and its associated problems.

The present invention seeks to provide an improved method for a verifying system to verify a location of a target apparatus. Whilst various embodiments are described below, the invention is not limited to these embodiments, and variations of these embodiments may well fall within the scope of the invention which is to be limited only by the appended claims.

In the following discussion, a method for verifying a location of a target apparatus is disclosed. The method utilises quantum mechanical ideas and is shown to work in any number of spacial dimensions. A verifying system and a target apparatus are also disclosed.

In short, a verifying system is able to coordinate the transmission of signals from a plurality of communication devices such that the signals arrive at an expected location of a target apparatus within a time frame. The verifying system is also able to encode a plurality of bits into quantum information and to send the quantum information to the expected location of the target apparatus via any suitable quantum channel. The target apparatus is able to process information provided by the signals in order to decode the plurality of bits from the quantum information, and then to send a response related to the plurality of bits back to communication devices of the verifying system. On receipt of the response, the verifying system is able to analyse the response from the target apparatus and the time between transmission of the signals and receipt of the response at each of the communication devices in order to determine that the location of the target apparatus has indeed been verified.

Firstly, common terminology used throughout this specification will be provided. Next, a generalised method for a verifying system to verify a location of a target apparatus will be provided. Following this, a position verification method in one dimension will be discussed. Next, a verification system and a target apparatus and a position verification method in two or more spacial dimensions will be discussed in detail. Following this, a position-based authentication scheme is discussed. In the Annexe, theorems and proofs concerning the disclosed methods are shown.

In the following discussion, certain standard terminology will be used throughout. In order to assist the reader a brief explanation of this terminology shall firstly be provided.

$\omega(x)$ denotes the Hamming weight of a string of bits, x. The binary entropy function is defined as $h(p)=-p \log$ p−(1−p)log(1−p), which is the entropy of a Bernoulli process with probability of success p. |x| denotes the absolute value or cardinality of x. ‖x‖ denotes the Euclidean norm.

$$x \xleftarrow{\$} M$$

means x is uniformly random from M, and x←A( ) means x is chosen by algorithm A.

The described methods and systems for position verification utilize quantum mechanical ideas. For $x \in \{0,1\}^n$, $|x\rangle$ denotes the quantum state x encoded in the computational basis, and $|\Psi\rangle$ denotes arbitrary quantum states (not necessarily in the computational basis). $\langle\Psi|$ is the conjugate transpose of $|\Psi\rangle$. For $B \in \{0,1\}^n$, $|x\rangle_B$ denotes x encoded in the bases specified by B, more precisely $|x\rangle_B = H^{B_1}|x_1\rangle \otimes \ldots \otimes H^{B_n}|x_n\rangle$ where H is the Hadamard matrix. An EPR pair has state $$\frac{1}{\sqrt{2}}|00\rangle + \frac{1}{\sqrt{2}}|11\rangle.$$

TD(ρ,ρ') denotes the trace distance between states ρ,ρ'. Given a (quantum) oracle algorithm A and a function H, $A^H(\ )$ means that A has oracle access to H and can query H on different inputs in superposition.

As mentioned above, in what follows, the terms "communication device" and "verifier" have been and can be used interchangeably, and both terms are used to describe components of a verifying system. The terms "target apparatus" and "prover" have been and can be used interchangeably.

Except for in certain circumstances which would be apparent to the skilled person, such as when a target apparatus, or prover, is located in a straight line between two communication devices, or verifiers, in order to verify the position of a target apparatus in n-dimensional space, at least n+1 communication devices are required. For example, in one-dimensional space, two communication devices are usually required; in two-dimensional space, three communication devices are usually required; and in three-dimensional space, four communication devices are usually required. If at least n+1 communication devices are not used in n-dimensional space then a position of a target apparatus may not be accurately determined along at least one spacial axis.

Figure 2:
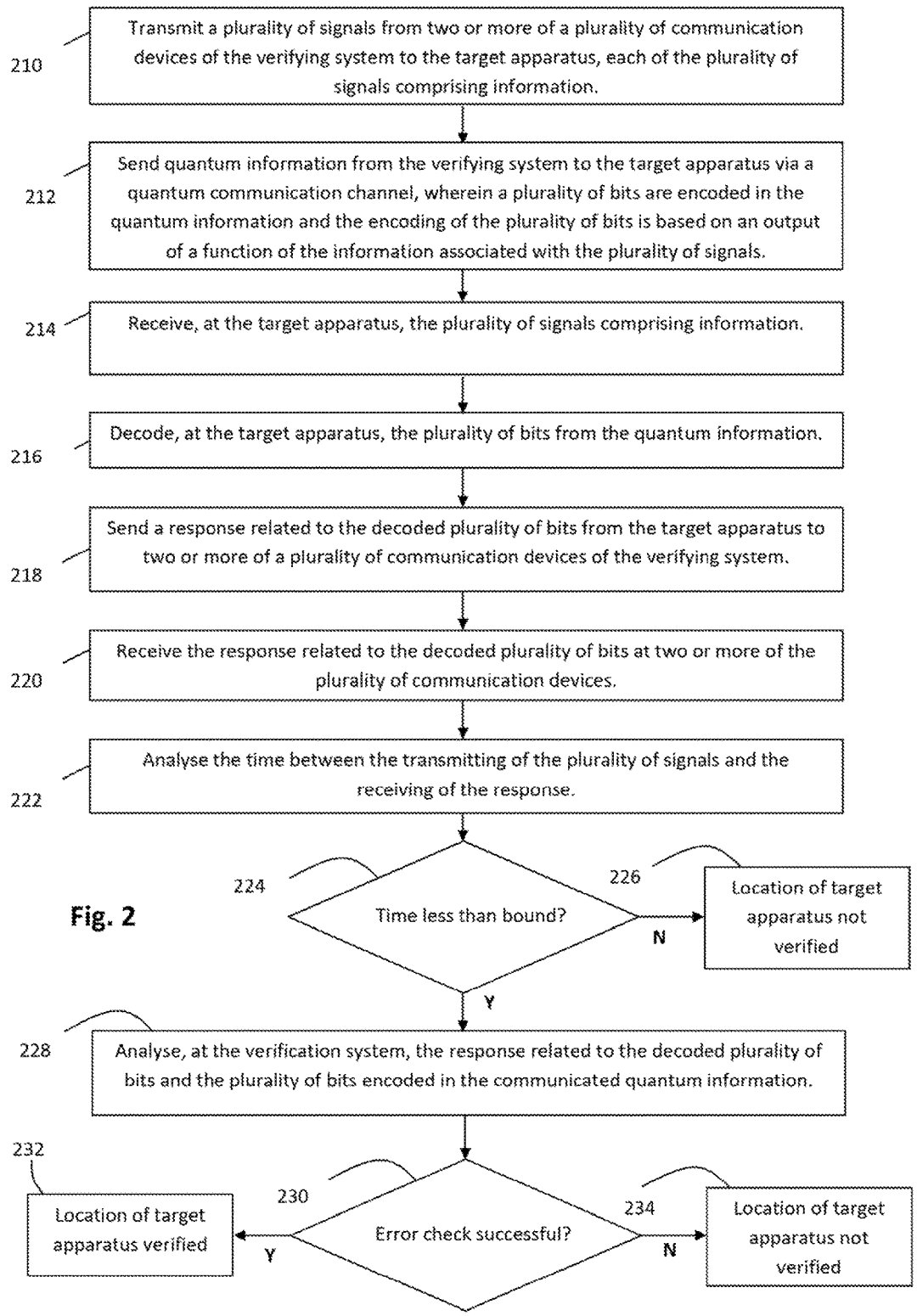
FIG. 2 shows a flowchart of a method for a verifying system to verify the location of a target apparatus.

FIG. 2 is a flowchart summarizing a method for a verifying system to verify a location of a target apparatus. At step 210 a plurality of signals are transmitted from two or more of a plurality of communication devices of the verifying system to the target apparatus. The plurality of signals comprise information such as a string of bits. For example, a first communication device may send a first bit string $x_1$ to the target apparatus, a second communication device may send a second bit string $x_2$ to the target apparatus and so on. The transmissions of the plurality of signals to the target apparatus may be timed such that the plurality of signals will be received by the target apparatus at substantially the same time $t_A$.

At step 212 quantum information is sent from the verifying system to the target apparatus via a quantum communication channel. A plurality of bits are encoded in the quantum information and the encoding of the plurality of bits is related to the information associated with the plurality of signals. In particular, the encoding of the plurality of bits may be based on an output of a function of the information associated with the plurality of signals. The function may be a non-linear function, for example a cryptographic hash function. The function may be a composition of functions. For example, the composition may contain, as a component, a linear function and as another component a non-linear function, so that the image of the linear function is the argument of the non-linear function. The non-linear function in the composition may be a cryptographic hash function. The linear function in the composition may be a bit wise XOR of its arguments. The output of the function of the information associated with the plurality of signals may indicate a basis of measurement for measuring a quantum state of a quantum object. For example, the output of the function may indicate a basis for measuring a polarisation state of the photon.

The skilled person would understand that step 210 and step 212 may be rearranged. For example, the quantum information may be sent before the plurality of signals are transmitted. Alternatively, the quantum information may be sent at substantially the same time as the transmission of the plurality of signals.

At step 214 the plurality of signals having associated information are received at the target apparatus. The signals may arrive at the same time or in quick succession.

At step 216 the target apparatus performs a decoding operation to decode the plurality of bits from the communicated quantum information. The decoding may be associated with the received plurality of signals. For example, the target apparatus may calculate a function of the associated information of the plurality of signals in order to indicate a decoding scheme. For example, and as described above, the function of the information associated with the plurality of signals may indicate a basis in which to measure a quantum state of one or more of the plurality of quantum objects, such as a polarisation state of the photon.

At step 218 a response related to the decoded plurality of bits is sent from the target apparatus to two or more of the plurality of communication devices of the verifying system. For example, the response may comprise the decoded plurality of bits. Alternatively, for added security or other reasons, the target apparatus may calculate some function of the decoded plurality of bits and the response may comprise the output of said function. The two or more communication devices may or may not be the same two or more communication devices that transmitted the plurality of signals to the target apparatus at step 210.

At step 220 the response related to the decoded plurality of bits is received at two or more of the plurality of communication devices.

At step 222, the time between the transmission of the plurality of signals from the verifying system to the target apparatus and the receiving of the response related to the decoded plurality of bits is analysed. In particular, discrepancies between said time and an expected time for transmitting the plurality of signals, processing the signals and quantum information at the target apparatus, and receiving the response related to the decoded plurality of bits at the verifying system, may indicate that the response did not originate at the target apparatus. Accordingly, at step 224 a check is made to see whether the time is less than a bound. The bound may take into consideration the time taken to transmit a signal from a communication device to the target apparatus, a time taken for the target apparatus to process the signal, a time taken for the target apparatus to decode a plurality of bits from received quantum information, and a time taken for receiving the response from the target apparatus. The bound may also take into consideration some error. For example, if the target apparatus is even slightly away from the expected location, then this would lead in an increased time in sending a response to the verifying system. That is, the bound may take into consideration that the target apparatus is not located at an expected position in space, but is instead located within a region around said position in space. If the time exceeds said bound then the method proceeds to step 226 and a determination is made that the location of the target apparatus has not been verified. However, if the time is less than the bound then the method proceeds to step 228.

At step 228 the response related to the decoded plurality of bits and the plurality of bits encoded in the communicated quantum information are analysed. At the verification system, an attempt is made to verify that the response corresponds to the plurality of bits encoded in the quantum information. That is, the verification system analyses the response to verify that the sender of the response did successfully decode the plurality of bits from the quantum information. A number of errors in the response may be tolerated.

At step 230, a determination is made as to whether the received response is correct based on the plurality of bits encoded in the communicated quantum information. If not, within error, then the method proceeds to step 234 and a determination is made that the location of the target apparatus has not been verified. If the response is found to be correct based on the plurality of bits encoded in the quantum information (within a tolerable error bound) then the method proceeds to step 232 and the verifying system determines that the location of the target apparatus has indeed been verified.

The skilled person would understand that the check as to whether the correct response was received may be performed before the check as to whether the response was received at the correct time.

Figure 3:
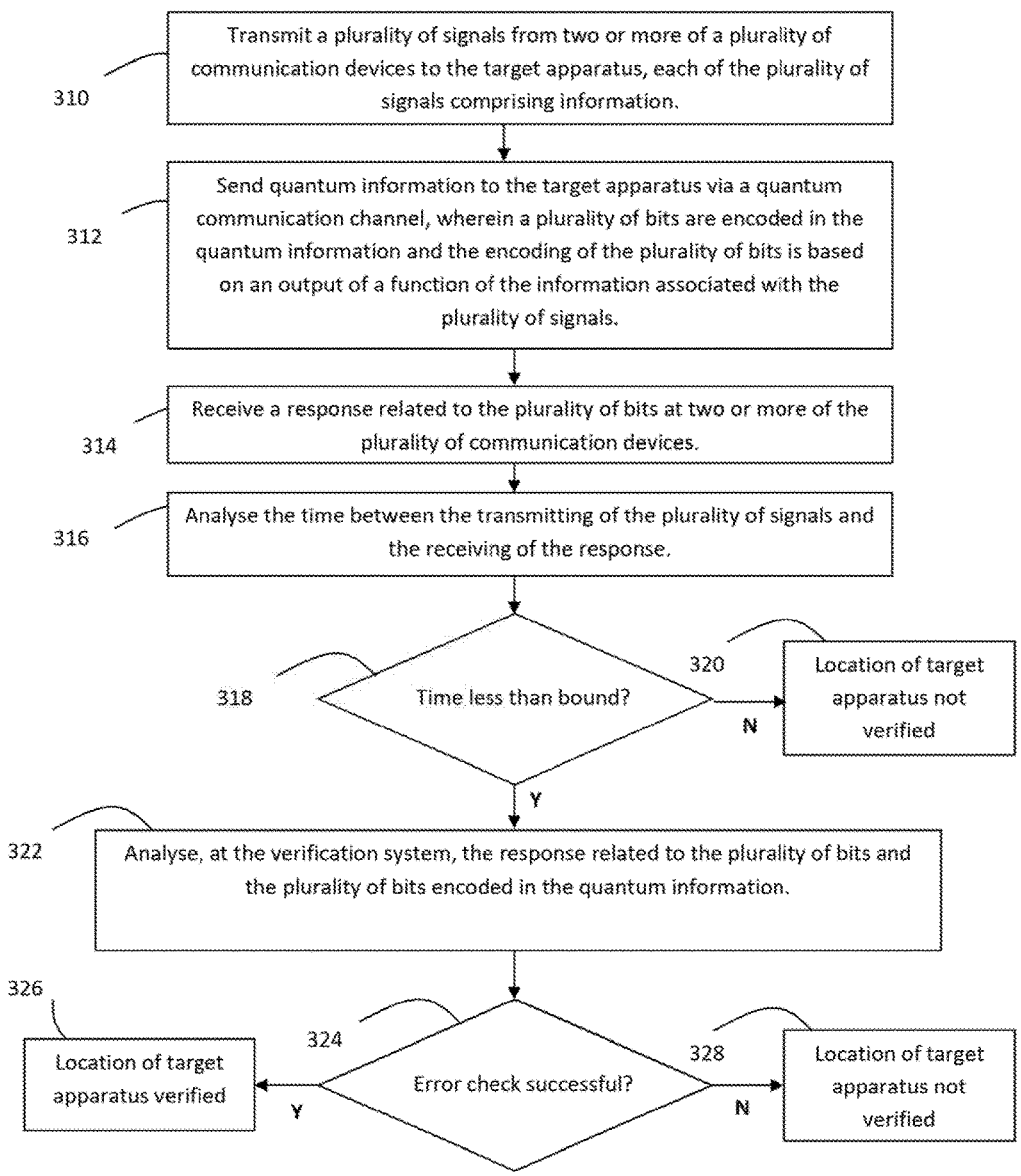
FIG. 3 shows a flowchart of a method for a verifying system to verify the location of a target apparatus.

FIG. 3 is a flowchart depicting a method for a verifying system to verify a location of a target apparatus according to an embodiment. In particular, FIG. 3 indicates a method carried out by the verifying system.

At step 310 a plurality of signals is transmitted from two or more of a plurality of communication devices to the target apparatus. Each signal of the plurality of signals comprises information.

At step 312 quantum information is sent to the target apparatus via a quantum communication channel. A plurality of bits are encoded in the quantum information and the encoding of the plurality of bits is based on an output of a function of the information associated with the plurality of signals.

The skilled person would understand that step 310 and step 312 may be rearranged. For example, the quantum information may be sent before the plurality of signals are transmitted. Alternatively, the quantum information may be sent at substantially the same time as the transmission of the plurality of signals.

At step 314 two or more of the plurality of communication devices receive a response related to the plurality of bits.

At step 316 the time between the transmitting of the plurality of signals and the receiving of the response at step 314 is analysed. A determination is made at step 318 as to whether or not this time is less than a predetermined bound. If the time is greater than the bound, then it may be that the response received at step 314 did not in fact originate from the target apparatus. Accordingly, a determination is made that the location of the target apparatus has not been verified (step 320). However, if the time is less than the bound then the method proceeds to step 322.

At step 322, the response related to the plurality of bits is analysed along with the plurality of bits encoded in the communicated quantum information. A determination is made as to whether or not the response corresponds to the plurality of bits encoded in the quantum information (within a tolerable error bound). (Step 324). If an error check is unsuccessful (step 324) then a determination is made that the location of the target apparatus has not been verified (step 328). However, if the error check is successful then the location of the target apparatus has been verified (step 326).

Figure 4:
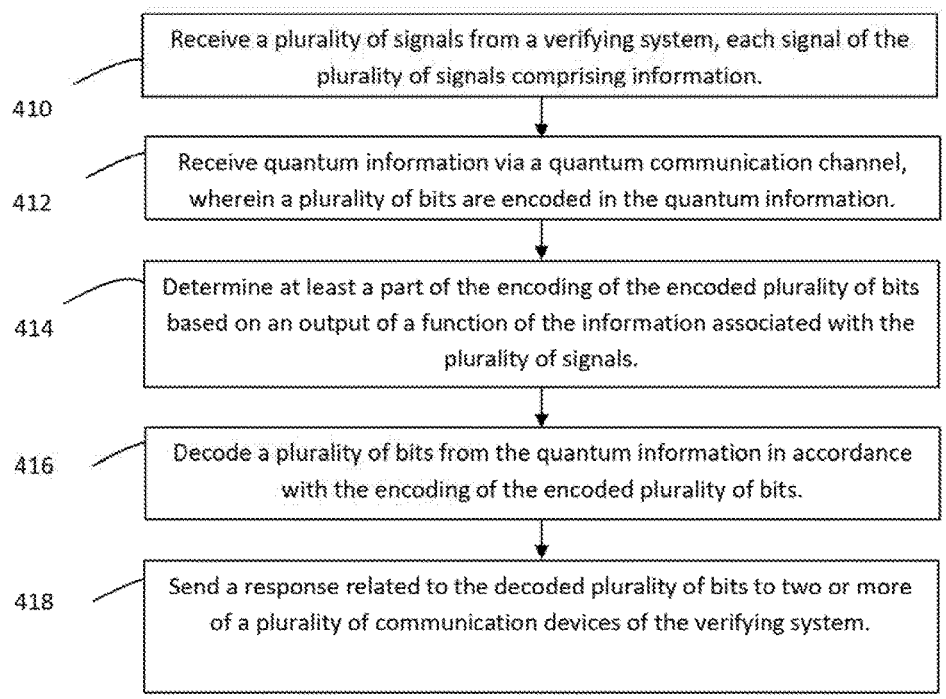
FIG. 4 shows a flowchart of a method for a target apparatus to prove its location to a verifying system.

FIG. 4 is a flowchart depicting a method for a target apparatus to prove its location to a verifying system, according to an embodiment. At step 410 a plurality of signals is received from a verifying system, the plurality of signals having associated information.

At step 412 quantum information is received via a quantum communication channel. The quantum information encodes a plurality of bits.

The skilled person would understand that step 410 and step 412 may be rearranged. For example, the quantum information may be received before the plurality of signals is received. Alternatively, the quantum information may be received at substantially the same time as the plurality of signals.

At step 414 at least a part of the encoding of the encoded plurality of bits is determined. The encoding is determined based on an output of a function of the information associated with the received plurality of signals. Once the encoding is known, a plurality of bits is decoded from the quantum information at step 416.

At step 418 a response related to the decoded plurality of bits is sent to two or more of the plurality of communication devices of the verifying system. The response may comprise for example the decoded plurality of bits, or information related to the decoded plurality of bits such as an output of a function of the decoded plurality of bits. It is then up to the verifying system to determine that the target apparatus has successfully proven it location.

Figure 5:
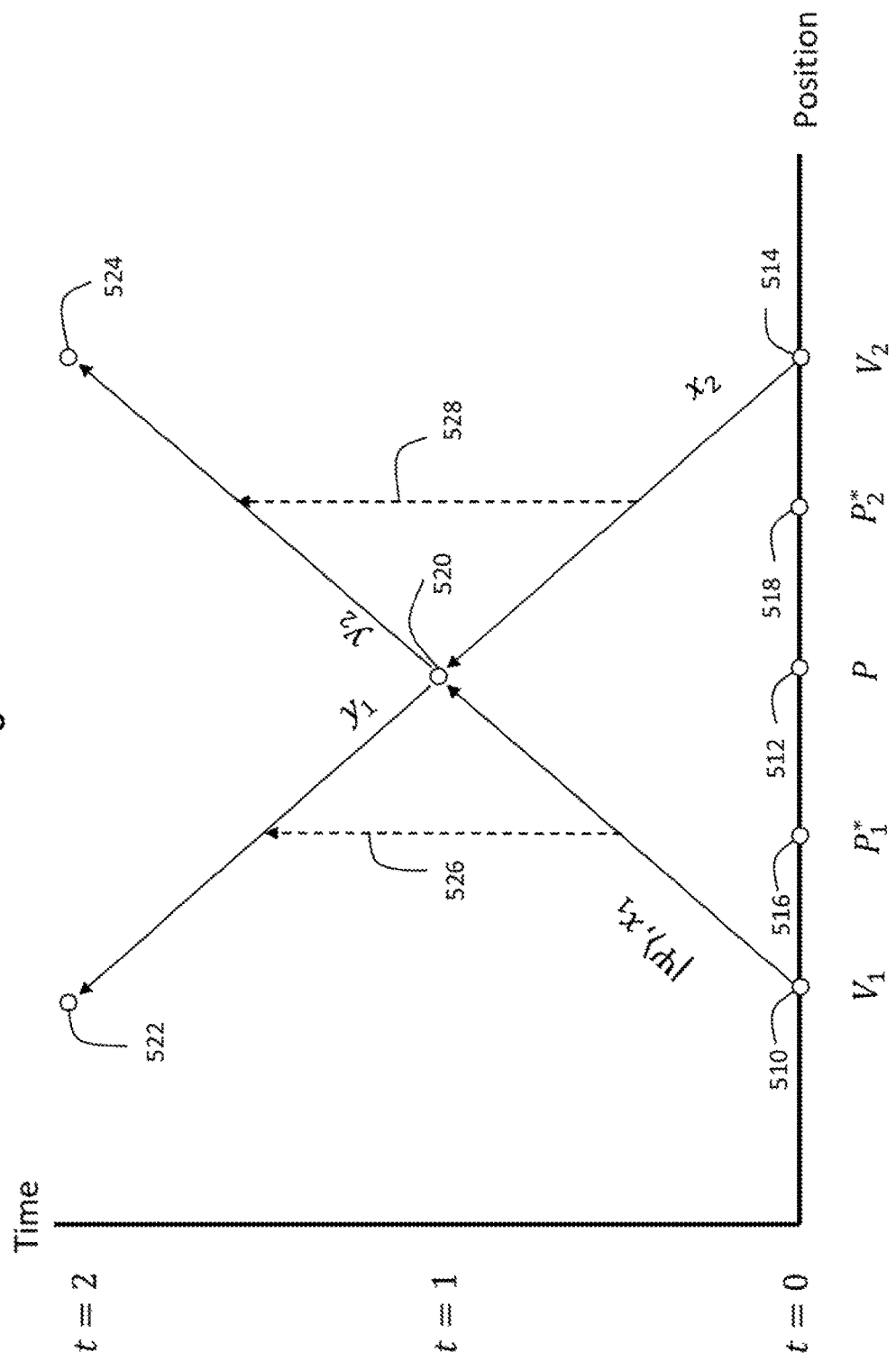
FIG. 5 shows a spacetime diagram illustrating a one dimensional position verification method.

A method of one-dimensional position verification is discussed, with reference to FIG. 5. That is, all communication devices (i.e. verifiers), the target apparatus (i.e. prover) and any adversarial devices are located on a line. In this example, units are adopted in which the speed of light, c, is equal to one.

FIG. 5 shows two communication devices (otherwise known as verifiers), $V_1$ and $V_2$, located at positions 510 and 514 respectively. A target apparatus, or prover, P is located at location 512, which in this example is equidistant between positions 510 and 514. The verifiers are configured to send messages at time t=0 to the prover P, which receives the messages at time t=1, as shown by event 520. The immediate response of the prover reaches the verifiers at time t=2 (events 522 and 524). In an attack, a malicious adversary has two adversarial/interceptor devices, $P_1^*$ and $P_2^*$ located to the left and right of position 512 at positions 516 and 518 respectively, but no device at position 512 where the honest prover P is located. The dotted lines 526 and 528 indicate additional message flows by the interceptor devices $P_1^*$ and $P_2^*$.

This setting simplifies notation and is sufficient to show all techniques needed in the one-dimensional case. The general one-dimensional case (including, for example, situations in which P is not located exactly in the middle of the verifiers, more interceptor devices are used by an adversary, and the prover P's responses are not instantaneous) will be a special case of position verification in the higher dimensional settings discussed later on.

The one-dimensional position verification method of this example is as follows. Let n (number of qubits) and l (bit length of classical challenges) be integers, $0 \leq \gamma < \frac{1}{2}$ (fraction of allowed errors). Let H: $\{0,1\}^l \to \{0,1\}^n$ be a hash function (modeled as a quantum random oracle). Before time t=0, verifier $V_1$ picks uniform $x_1, x_2 \in \{0,1\}^l$, $\hat{y} \in \{0,1\}^n$ and forwards $x_2$ to $V_2$ over a secure channel. At time t=0, $V_1$ sends $|\Psi\rangle$ and $x_1$ to P. Here $B := H(x_1 \oplus x_2)$, $|\Psi\rangle := |\hat{y}\rangle_B$. Verifier $V_2$ sends $x_2$ to P. At time t=1, P receives $|\Psi\rangle$, $x_1$, $x_2$, computes $B := H(x_1 \oplus x_2)$, measures $|\Psi\rangle$ in basis B to obtain outcome $y_1$, and sends $y_1$ to $V_1$ and $y_2 := y_1$ to $V_2$. (In this example, it is assumed that all these actions are instantaneous, so P sends $y_1, y_2$ at time t=1). At time t=2, $V_1$ and $V_2$ receive $y_1, y_2$. Using secure channels, they check whether $y_1 = y_2$ and $\omega(y_1 - \hat{y}) \leq \gamma n$. If so (and $y_1, y_2$ arrived in time), they accept. That is, the location of prover P is determined to have been verified.

The reader is directed to the Annexe for a theorem and proof concerning the security of the above method.

Methods and systems for a verifying system to verify a location of a target apparatus in higher dimensional settings will next be described. For convenience, a position verification system and method for operating in two spacial dimensions is discussed in detail. The skilled person would appreciate that the teachings in relation to the discussed two-dimensional example could be extrapolated to a higher dimensional setting or a one-dimensional setting. Furthermore, the skilled person would understand that spacetime need not be flat for the described embodiments to work.

Figure 6:
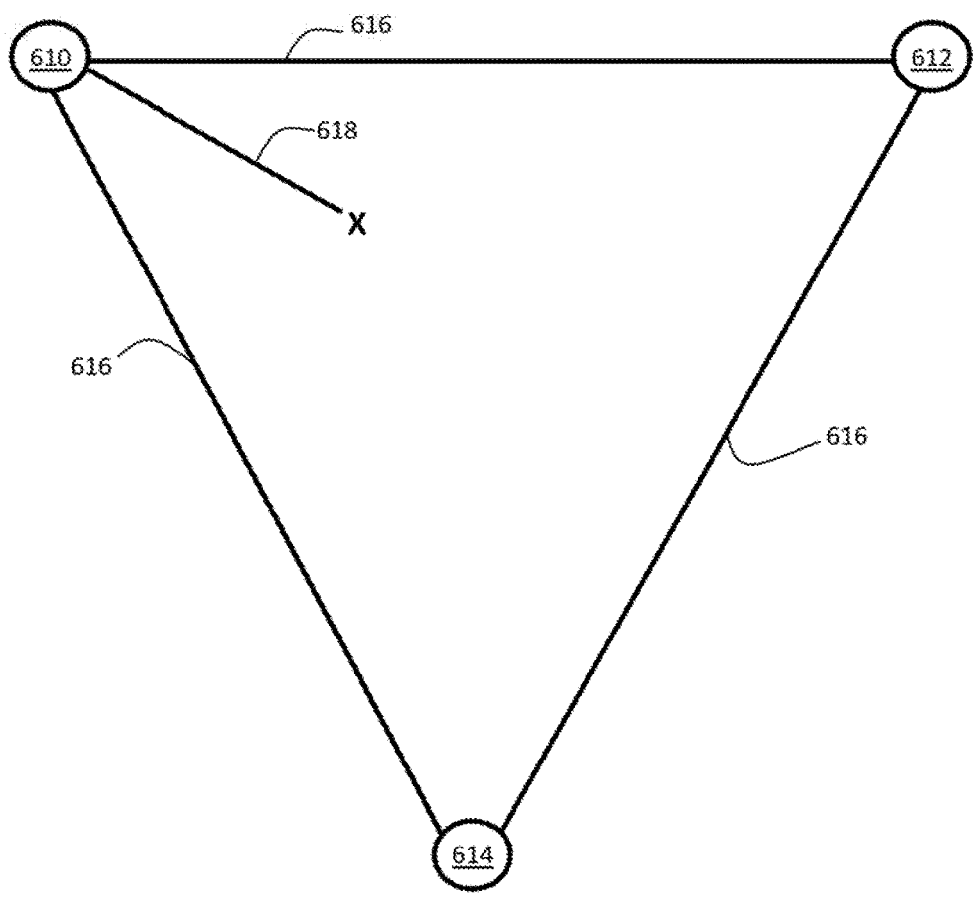
FIG. 6 illustrates a two dimensional verification system.

Referring firstly to FIG. 6, there is shown a verifying system for verifying a location of a target apparatus. In particular, the verifying system is capable of verifying a location of a target apparatus (not shown) that is expected to be at position X. The verifying system comprises a first communication device 610 located at a first distance, $d_1$, from position X, a second communication device 612 located at a second distance, $d_2$, from position X, and a third communication device 614 located at a third distance, $d_3$, from position X. In the example shown in FIG. 6, the first distance is greater than the second distance and the second distance is greater than the third distance.

Each of the communication devices 610, 612 and 614 is configured for broadcasting a signal capable of reaching position X. Accordingly, a first signal broadcast from the first communication device 610 would take a first time duration, $t_1$, to reach position X, a second signal broadcast from the second communication device 612 would take a second time duration, $t_2$, to reach position X, and a third signal broadcast from the third communication device 614 would take a third time duration, $t_3$, to reach position X. In the arrangement shown in FIG. 6 the signals are assumed to be radio frequency transmissions and so information is sent at substantially the speed of light. Due to the different distances between each of the communication devices and the position X, the first time duration is greater than the second time duration and the second time duration is greater than the third time duration. Each of the communication devices 610, 612 and 614 is additionally configured for receiving signals, in particular information originating from a device, such as the target apparatus, located at position X.

Secure communication channels 616 exist between the communication devices 610, 612, and 614 and the communication devices 610, 612, and 614 are configured to send and receive messages from each other. In particular, communication channels 616 are used to coordinate the broadcasting of signals from each of the communication devices 610, 612, 614 and to share received signals and/or information concerning the received signals. The locations of each of the communication devices 610, 612, and 614 are known, and the communication devices have synchronised clocks.

Additionally, there exists a quantum communication channel between at least one of the communication devices 610, 612 and 614 and position X. In the embodiment shown in FIG. 6, first communication device 610 is communicatively coupled to position X via quantum communication channel 618. The first communication device 610 is configured to encode one or more bits of information into quantum states of quantum objects and to send the encoded information towards position X via quantum communication channel 618. The first communication device 610 may also receive quantum information via the quantum communication channel 618.

Figure 7:
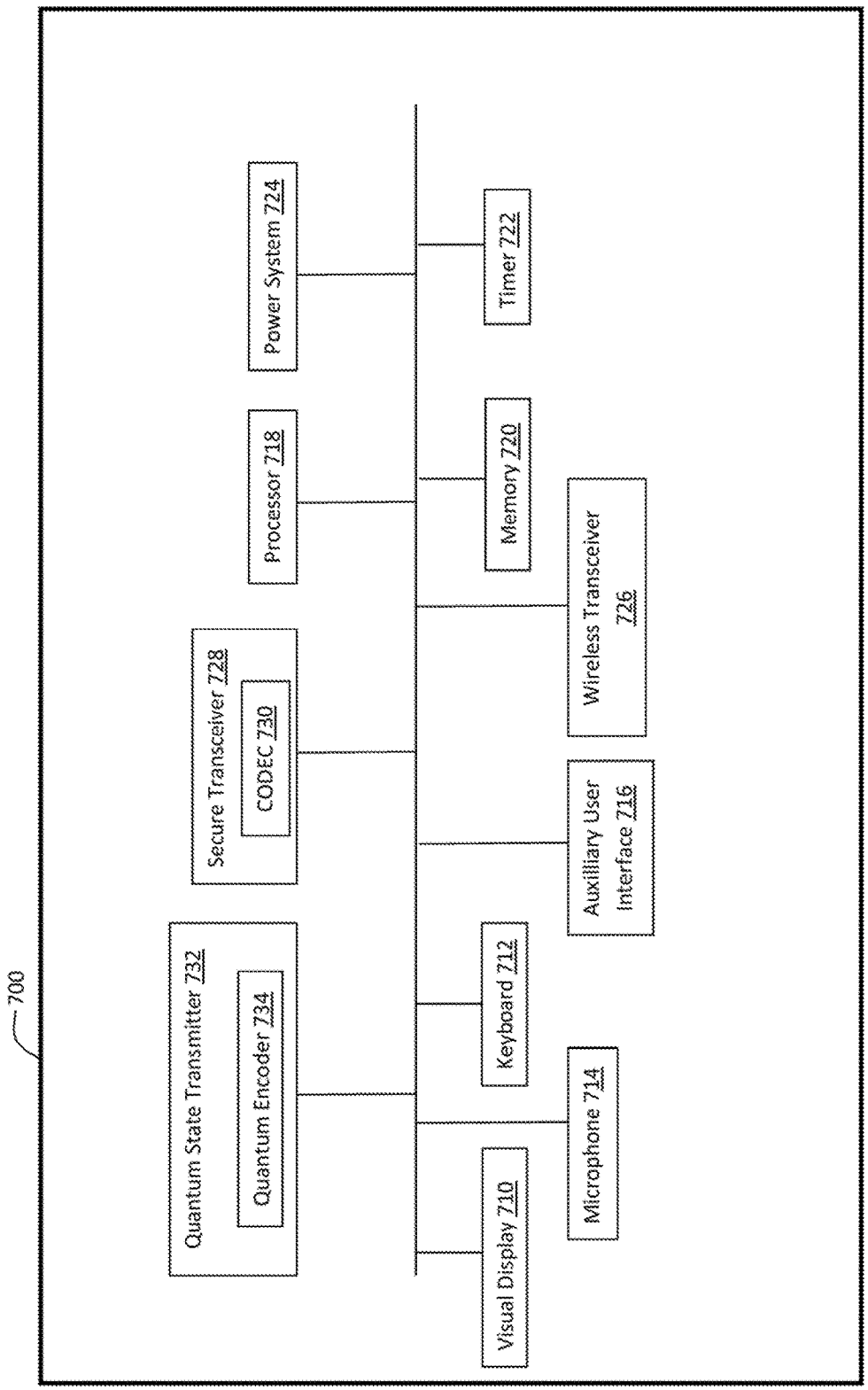
FIG. 7 shows a block diagram of a communication device.

FIG. 7 illustrates an example communication device for use with a verifying system for verifying a location of a target apparatus. The communication device of FIG. 7 is suitable for use in the verifying system shown in FIG. 6. Other architectures to that shown in FIG. 7 may be used as will be appreciated by the skilled person.

Referring to the Figure, the exemplary communication device 700 includes a number of user interfaces including a visual display 710, a virtual or dedicated keyboard 712, a microphone 714, and one or more auxiliary user interfaces 716. The communication device 700 further includes a processor 718, a memory 720, a timer 722 and a power system 724. The communication device 700 further comprises a wireless transceiver 726 for broadcasting radio frequency signals, and a secure transceiver 728 for communicating with other communication devices (not shown), the secure transceiver including a codec (i.e. a COder-DECoder device capable of encoding and/or decoding a digital data signal) 730. Additionally, the communication device 700 comprises a quantum state transmitter 732 for sending quantum information over a quantum channel, the quantum state transmitter 732 including a quantum encoder (i.e. apparatus capable of encoding classical information such as bits into quantum states of quantum objects) 734.

The processor 718 is configured to receive data, access the memory 720, and to act upon instructions received either from said memory 720, from said wireless transceiver 726, from said secure transceiver 728 or from any of the user interface devices 712, 714, 716. The processor 718 is further configured to start said timer 722 and to stop said timer 722. In particular, the processor is configured to start said timer 722 when instructing the wireless transceiver 726 to broadcast a signal, and to stop said timer 722 when receiving a response signal through wireless transceiver 726. The processor is further configured to analyse timer data.

The wireless transceiver 726 is configured to communicate classically and publicly. That is, the wireless transceiver 726 is arranged to receive data from the processor 718 such as a string of bits and may broadcast said string of bits, or a function of said string of bits, over a network (not shown). The wireless transceiver 728 is also arranged to receive data from external sources and communicate the received data to the processor 718.

The secure transceiver 728 is configured to securely communicate with secure transceivers in other communication devices. That is, the secure transceiver 728 can receive instructions from the processor 718 such as instructions to send data or commands to a secure transceiver of another communication device. The secure transceiver 728 can then encrypt the data or commands using the codec 730 and transmit the encrypted data or commands over communication channel 616. Additionally or alternatively, the secure transceiver 728 can receive encrypted data or commands from other communication devices over communication channel 616. The secure transceiver 728 can then decrypt the data or commands using the codec 730 and pass the data or commands to the processor 718.

The quantum state transmitter 732 is configured to receive data, such as sequences of bits, from the processor 718. In one embodiment, the quantum state transmitter is configured to receive a randomly generated sequence of bits from the processor to be encoded. The quantum state transmitter is also configured to receive a second sequence of bits to assist in encoding the randomly generated sequence of bits. The randomly generated sequence of bits can then be encoded into quantum states of quantum objects using the quantum encoder 734. That is, the quantum state transmitter is configured to encode classical information into quantum information. The quantum state transmitter is further configured to communicate the quantum information containing the encoded data over quantum communication channel 618.

Figures 8, 9:
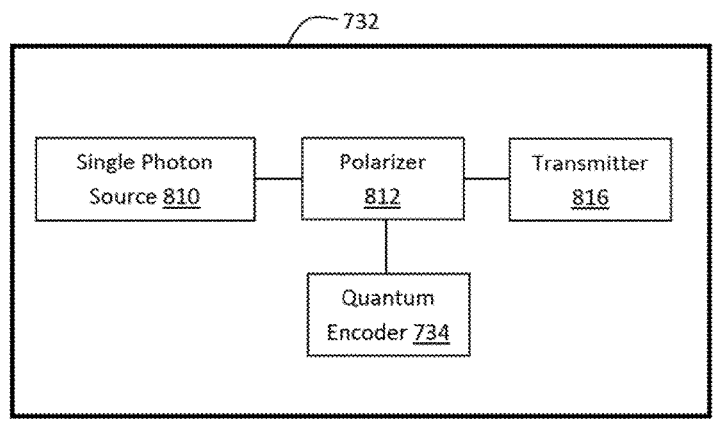
FIG. 8 shows a block diagram of a quantum state transmitter.
FIG. 9 shows a table showing a possible photon polarization scheme.

FIG. 8 shows an example of a quantum state transmitter 732. In the arrangement shown in FIG. 8, classical message bits are encoded into the polarisation states of photons and the photons are transmitted over quantum communication channel 618 by transmitter 816. A single photon source 810 is configured to sequentially send one or more photons to polarizer 812. The polarizer is controlled by the quantum encoder 734, which in turn is controlled by processor 718.

The quantum encoder 734 is configured to receive a series of message bits from processor 718 to be transmitted across quantum communication channel 618. The quantum encoder 734 is further configured to receive a series of basis bits from processor 718. For each message bit in the series of message bits, the quantum encoder 734 consults a corresponding basis bit of the series of basis bits. The quantum encoder 734 then causes the polarizer 812 to polarize a photon based on the value of the message bit and the basis bit according to a predetermined scheme. For example, as can be seen in the table of FIG. 9, if a basis bit has value 0, then a photon is to be polarized according to a rectilinear basis. That is, if a basis bit has a value 0 and a corresponding message bit has a value 0, then the quantum encoder 734 causes a horizontally polarized (substantially 0°) photon to be transmitted from the quantum state transmitter 732. If the basis bit has a value 0 and the corresponding message bit has a value 1, then the quantum encoder 734 causes a vertically polarized (substantially 90°) photon to be transmitted from the quantum state transmitter 732. If a basis bit has a value 1 then a photon is to be polarized according to a diagonal basis. That is, if the basis bit has a value 1 and the corresponding message bit has a value 0, then the quantum encoder 734 causes a photon polarized at substantially 45° to be transmitted from the quantum state transmitter 732. If the basis bit has a value 1 and the corresponding message bit has a value 1, then the quantum encoder 734 causes a photon polarized at substantially 135° to be transmitted from the quantum state transmitter 734.

As the rectilinear basis and the diagonal basis form a set of mutually unbiased bases, if a photon polarized in the rectilinear basis is measured by a measurer in the diagonal basis, the measurer will not be able to accurately determine whether the photon was horizontally or vertically polarized (i.e. whether or not the message bit was a 0 or a 1). Similarly, if a photon polarized in the diagonal basis is measured in the rectilinear basis, the measurer will not be able to accurately determine whether the encoded message bit was a 0 or a 1.

Accordingly, communication devices 610, 612 and 614 are able to agree on a series of bit strings over a secure channel 616, each bit string to be broadcast by a respective communication device so as to arrange for the bit strings to arrive at position X at substantially the same time. The broadcast bit strings may enable an encoding scheme to be worked out, the encoding scheme used to encode randomly generated challenges in quantum information to be communicated to position X. The communication devices are able to receive signals in response to a broadcast bit string and the transmission of quantum information, and to analyse the received signal so as to determine whether or not a target apparatus is present in the vicinity of location X.

Figure 10:
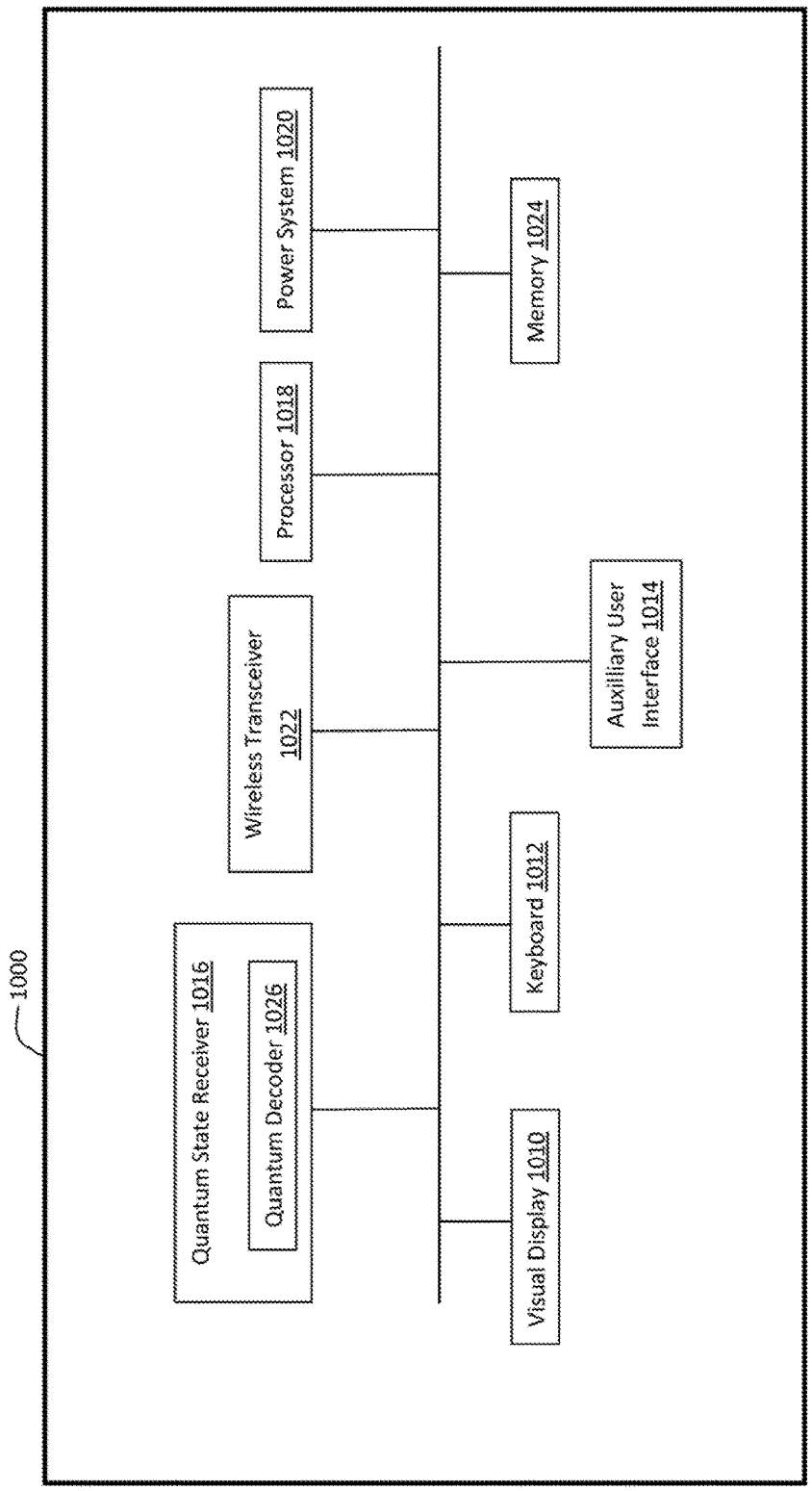
FIG. 10 shows a block diagram of a target apparatus.

FIG. 10 illustrates an example target apparatus 1000 configured to prove its location to a verifying system. The target apparatus of FIG. 10 is configured to communicate over classical and quantum channels with the verifying system of FIG. 6 and, accordingly, is able to verify that it is located at position X. Other architectures to that shown in FIG. 10 may be used as will be appreciated by the skilled person.

Referring to FIG. 10, the exemplary target apparatus 1000 includes a number of user interfaces including a visual display 1010, a virtual or dedicated keyboard 1012, and one or more auxiliary user interfaces 1014. The target apparatus 1000 further includes a processor 1018, a memory 1024 and a power system 1020. The target apparatus 1000 further comprises a wireless transceiver 1022 for broadcasting and receiving signals. Additionally, the target apparatus 1000 comprises a quantum state receiver 1016 for communicating over a quantum channel 1018, the quantum state receiver 1016 including a quantum decoder 1026 (i.e. apparatus capable of decoding classical information such as bits from quantum states of quantum objects).

The processor 1018 is configured to receive data, access the memory 1024, and to act upon instructions received either from said memory 1024, from said wireless transceiver 1022, or from any of the user interface devices 1012, 1014.

The wireless transceiver 1022 is configured to communicate classically and publicly. That is, the wireless transceiver 1022 may receive data from the processor 1018 such as a string of bits and may broadcast said string of bits over a network (not shown). The wireless transceiver 1022 may also receive data from external sources such as communication devices 700 and communicate the received data to the processor 1018.

The quantum state receiver 1016 is configured to receive quantum information, such as a series of qubits, from the verifying system via the quantum communication channel 618. The quantum state receiver 1016 is also configured to decode a sequence of bits from the quantum information using the quantum decoder 1026.

Figure 11:
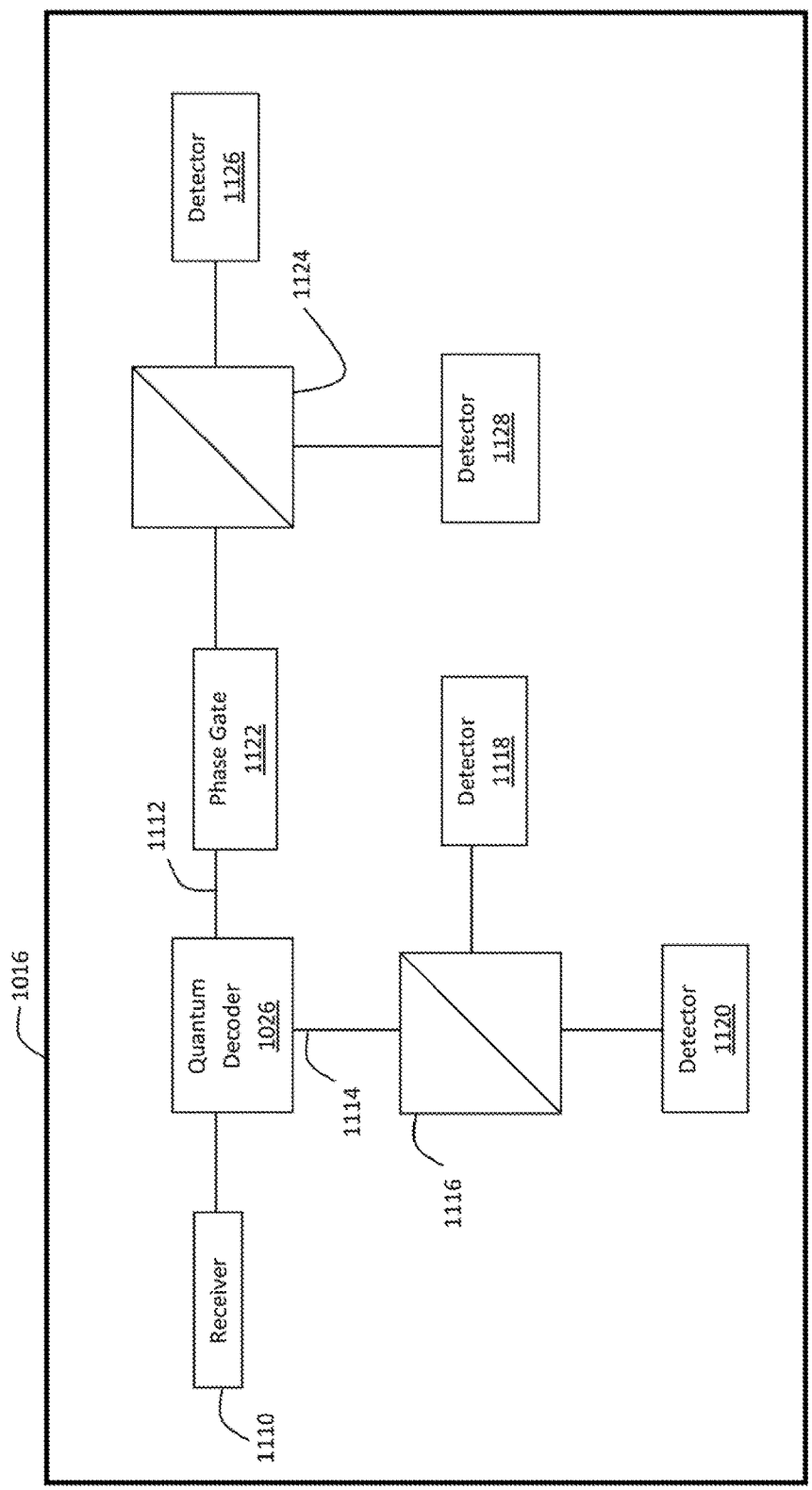
FIG. 11 shows a block diagram of a quantum state receiver.

FIG. 11 shows a quantum state receiver 1016 according to an embodiment. In this embodiment, polarized photons are received at receiver 1110 over quantum communication channel 618 and classical message bits are decoded from the polarisation states of the photons. The quantum decoder 1026 is configured to receive information from processor 1018 and, dependent on said information from the processor 1018, to send each received photon along path 1112 towards phase gate 1122, or along path 1114 towards polarized beamsplitter 1116. Photons sent along path 1114 are detected at detector 1118 or at detector 1120. Photons sent along path 1112 will pass through phase gate 1122, which may be a rotator, and are sent to the polarized beamsplitter 1124 before detection at detector 1126 or at detector 1128.

The quantum decoder 1026 is configured to receive a series of basis bits from processor 1018. The quantum decoder 1026 is configured to consult each basis bit and to determine along which path to send a corresponding photon based on the value of the basis bit according to a predetermined scheme. For example, if the basis bit has a value 0 then a determination is made that a message bit is encoded into the polarization state of a corresponding received photon in the rectilinear basis (see FIG. 9), and the quantum decoder sends the corresponding received photon along path 1114 towards the polarized beamsplitter 1116. If the basis bit has a value 1 then a determination is made that a message bit is encoded into the polarization state of a corresponding photon in the diagonal basis, and the quantum decoder sends the corresponding received photon along path 1112 towards phase gate 1122. If detector 1120 indicates that a photon has been received, then a determination is made that a message bit encoded in the polarization state of the detected photon has a value of 0. If detector 1118 indicates that a photon has been received, then a determination is made that a message bit encoded in the polarization state of the detected photon has a value of 1. If detector 1126 indicates that a photon has been received, then a determination is made that a message bit encoded in the polarization state of the detected photon has a value of 0. If detector 1128 indicates that a photon has been received, then a determination is made that a message bit encoded in the polarization state of the detected photon has a value of 1.

For successful decoding of message bits from the polarization states of received photons, the sequence of basis bits received by the quantum decoder 1026 should have the same values as the sequence of basis bits used by encoder 734 in encoding the message bits into the polarization states of the photons. In this way, the target apparatus 1000 is able to successfully decode a series of message bits from a sequence of photons from a quantum state transmitter 732.

A process of verifying a location of a target object according to an embodiment will now be described by way of the example disclosed above. In this example a target apparatus 1000 is expected to be located, and is located, at position X. Accordingly, the target apparatus is in place to receive broadcast signals from communication devices 610, 612 and 614 at a computable time, to receive quantum information over quantum communication channel 618 from the verification system, and to transmit information to communication devices 610, 612 and 614 within a computable time frame. For the sake of this example, it is assumed that the processor of communication device 610 is configured to coordinate the activities of all communication devices 610, 612 and 614.

Three random bit strings $x_1$, $x_2$ and $x_3$ are chosen by the verification system. For example, the chosen bit strings are $x_1$=0101, $x_2$=1100 and $x_3$=0001. In this example, the processor 718 of the first communication device 610 chooses the three random bit strings. Bit string $x_2$ is communicated over secure communication channel 616 to the second communication device 612. Bit string $x_3$ is communicated over secure communication channel 616 to the third communication device 614.

At first communication device 610, a function of the bit strings is computed in order to determine a sequence of encoding bits, which in this example are the basis bits to be used by the quantum state transmitter 732 of the first communication device 610 and the quantum state receiver of the target apparatus 1000. In this example, the processor computes $$b_1 b_2 b_3 = H(x_1 \oplus x_2 \oplus x_3) \quad (1)$$

where $\oplus$ denotes the bitwise XOR operation and $b_j$ represents the value of the $j^{th}$ basis bit. H(z) is a function that applies a cryptographic hash function, such as SHA-3, to string z (padded to a suitable length) and returns the first three bits of the hash value. In this example, $$H(x_1 \oplus x_2 \oplus x_3) = H(1000) = 011 \quad (2)$$

and so the encoding bits have values $b_1$=0, $b_2$=1 and $b_3$=1.

The processor 718 of the first communication device 610 chooses three random bits, $y_1$, $y_2$ and $y_3$. In this example, the random bits are $y_1$=1, $y_2$=0 and $y_3$=1. The randomly chosen bits are to be encoded into quantum states of quantum objects and communicated to the target apparatus at position X over quantum communication channel 618.

The randomly chosen bits $y_1$, $y_2$ and $y_3$, and the encoding bits $b_1$, $b_2$ and $b_3$ are then sent to the quantum state transmitter 732 of the first communication device 610. The first basis bit, $b_1$, has value 0 and so the first message bit, $y_1$, is encoded in the rectilinear basis. As $y_1$=1, a first photon is polarized in a vertical direction (+90°). The second and third basis bits, $b_2$ and $b_3$, have value 1 and so the second and third message bits, $y_2$ and $y_3$, are encoded in the diagonal basis. As $y_2$=0, a second photon is polarized at an angle of substantially +45° from horizontal. As $y_3$=1, a third photon is polarized at an angle of substantially +135° from horizontal.

The three communication devices 610, 612 and 614 then transmit the classical bit strings $x_1$, $x_2$ and $x_3$ respectively so as to arrive at position X at substantially the same arrival time, $t_4$. In order to do this, the first communication device 610 transmits bit string $x_1$ at time $t_4-t_1$, where $t_1$ is a pre-calculated time taken for a signal to reach position X from the first communication device. The processor 718 of the first communication device simultaneously starts a first timer 722 at the first communication device. The second communication device 612 transmits bit string $x_2$ at time $t_4-t_2$, and simultaneously starts a second timer at the second communication device 612. The third communication device 614 transmits bit string $x_3$ at time $t_4-t_3$ and simultaneously starts a third timer at the third communication device 614. By transmitting classical bit strings $x_1$, $x_2$ and $x_3$ so as to arrive at position X at substantially the same arrival time $t_4$, the verifying system ensures that, outside of the verifying system itself, the earliest time at which all three bit strings $x_1$, $x_2$ and $x_3$ can be known at a single point in space is $t_4$. That is, a target apparatus located at position X is able to learn all three bit strings $x_1$, $x_2$ and $x_3$ at time $t_4$. At any position other than X, all three bit strings can not be known until a time later than $t_4$.

At time $t_4$ the target apparatus located at position X receives the classical bit strings $x_1$, $x_2$ and $x_3$ from the verification system. The processor 1018 at the target apparatus computes values of the basis bits $b_1$, $b_2$ and $b_3$ by calculating $H(x_1 \oplus x_2 \oplus x_3)$ and communicates these bit values to quantum state receiver 1016. As $b_1$ has value 0, a determination is made that a first photon communicated over quantum communication channel 618 has a message bit encoded in the rectilinear basis. As $b_2$ has value 1, a determination is made that a second photon communicated over quantum communication channel 618 has a message bit encoded in the diagonal basis. As $b_3$ has value 1, a determination is made that a third photon communicated over quantum communication channel 618 has a message bit encoded in the diagonal basis.

The photons encoding the message bits are then sent from the first communication device 610, over the quantum communication channel 618, to the target apparatus located at position X. As the first basis bit $b_1$ has value 0, the first photon is measured in the rectilinear basis using a detector configuration that can distinguish between 0° polarization and +90° polarization. In the event of no errors, the detector configuration measures a photon of +90° polarization, corresponding to a message bit having value 1. As the second and third basis bits have value 1, the second and third received photons are measured in the diagonal basis using a detector configuration that can distinguish between +45° polarization and +135° polarization. In the event of no errors, message bits $y_2$ and $y_3$ are also recovered. In this way, at the target apparatus, the values of message bits $y_1$, $y_2$ and $y_3$ are decoded from the received quantum information.

The decoded classical bits $y_1$, $y_2$ and $y_3$ are transmitted from the target apparatus to the communication devices 610, 612 and 614. In some arrangements, all of the bits are sent to all communication devices of the verification system. In other arrangements, each of the decoded bits is sent to a different communication device of the verifying system.

When the decoded plurality of bits $y_1$, $y_2$ and $y_3$, are received at the first communication device from the target apparatus, the first timer at the first communication device is stopped. The elapsed time between the first communication device 410 transmitting $x_1$ to the target apparatus and the time at which the decoded plurality of bits is received is calculated. When the decoded plurality of bits is received at the second communication device from the target apparatus, the second timer at the second communication device is stopped. The elapsed time between the transmission of $x_2$ to the target apparatus and the receipt of the decoded plurality of bits $y_1$, $y_2$ and $y_3$ is calculated. The time difference is then communicated via secure communication channel 616 to the processor of the first communication device 610. When the decoded plurality of bits is received at the third communication device from the target apparatus, the third timer at the third communication device is stopped. The elapsed time between the transmission of $x_3$ to the target apparatus and the receipt of the decoded plurality of bits $y_1$, $y_2$ and $y_3$ is calculated. The time difference is then communicated via secure communication channel 616 to the processor of the first communication device 610.

Additionally or alternatively, the second and third communication devices may transmit to the first communication device the respective times at which the bit strings $x_2$ and $x_3$ were transmitted to the target apparatus and the respective times at which the decoded plurality of bits was received from the target apparatus. The first communication device 610 may then perform the calculations of the elapsed time between transmission of bit strings $x_2$ and $x_3$ to the target apparatus and receipt of the decoded plurality of bits from the target apparatus.

At the first communication device 610, the received plurality of bits is analysed and a comparison is performed of the received plurality of bits and the plurality of bits that was encoded in the quantum information communicated to the target apparatus. A determination is then made, from the comparison, as to whether or not the received plurality of bits are from the target apparatus. Furthermore, the time between the transmitting of the plurality of signals and the receiving of the plurality of bits is performed.

Before time $t_A$, there is no point in space, outside of the verification system itself, at which all bit strings $x_1$, $x_2$ and $x_3$ are known. Accordingly, before time $t_A$, there is no point in space at which the randomly generated bits $y_1$, $y_2$ and $y_3$ are known outside of the verification system itself. The expected lapsed time $t_{ej}$ between the transmission of $x_j$ (j=1, 2, 3) from the j$^{th}$ communication device to the target apparatus and the receipt of a plurality of bits at the j$^{th}$ communication device from the target apparatus is:

$$t_{ej} = 2t_j + t_p \qquad (3)$$

where $t_j$ is the time taken for a broadcast signal to reach the target apparatus from the j$^{th}$ communication device, and $t_p$ is a processing time for the target apparatus to process the bit strings $x_1$, $x_2$ and $x_3$, and to decode the message bits $y_1$, $y_2$ and $y_3$ from the received quantum information. If the first communication device received the plurality of bits from the target apparatus at a time later than $t_A - t_1 + t_{e1}$ then a determination is made that the location of the target apparatus is not verified. If the second communication device received the plurality of bits from the target apparatus at a time later than $t_A - t_2 + t_{e2}$ then a determination is made that the location of the target apparatus is not verified. If the third communication device received the plurality of bits from the target apparatus at a time later than $t_A - t_3 + t_{e3}$ then a determination is made that the location of the target apparatus is not verified.

Additionally, the plurality of bits received at each communication device is compared with the plurality of bits received at other communication devices. A certain amount of errors is tolerable. If the values of the bits received at each of the communication devices do not match (within a tolerable error bound) the values of the bits encoded in the quantum information then a determination is made that the location of the target apparatus has not been verified. Alternatively, if the values of the received bits match the values of the bits encoded in the quantum information, and the received bits arrived within the expected time windows, then a determination is made that the location of the target apparatus has been verified.

Position verification is a primitive which guarantees that no party located outside of a region around the target apparatus can pass the verification. Yet nothing about the position verification methods discussed above prevents an adversary from waiting until some other honest party has successfully passed position verification, and then impersonating that honest party. A stronger primitive may be used that not only proves that a prover is at a specific location, but also allows the prover to bind this proof to specific data, for example a message. The difference is similar to that between identification schemes and message authentication schemes. Such a primitive is called position-based authentication. This guarantees that an adversary cannot authenticate a message m unless he is in a region P around the prover.

For added security, the disclosed methods for a verifying system to verify a location of a target apparatus may be used to authenticate a message sent from the target apparatus to the verifying system. For example, the target apparatus may communicate a message m to the verifying system prior to the commencement of the location verification methods disclosed above. The verification system may then use a verification method to check that the message m did originate from the target apparatus.

Position based authentication works in much the same way as position verification except with the following modification: whenever the verifying system or prover considers a function of the information associated with the transmitted/received plurality of signals in the arrangements described above, they instead consider a function of the information associated with the plurality of signals and the message m, where m is the message to be authenticated.

As an example, consider a two dimensional scenario such as that described in relation to FIG. 6. After receiving the message m, the verifying system may calculate basis bits $b_1$, $b_2$ and $b_3$ from the output of a function of the bit strings $x_1$, $x_2$, $x_3$ and the message m. For example, the verifying system may calculate the basis bits from $$b_1 b_2 b_3 = H(x_1 \oplus x_2 \oplus x_3 \| m) \tag{4}$$

and encrypt the randomly generated bits $y_1$, $y_2$ and $y_3$ accordingly for transmission of the quantum information. The verifying system may then send a plurality of signals containing $x_1$, $x_2$ and $x_3$ and the quantum information to the target apparatus. On receiving $x_1$, $x_2$ and $x_3$ the target apparatus may then decrypt the randomly generated bits. The target apparatus may then send the decoded plurality of bits (or a function of the decoded plurality of bits) to the verifying system. The verifying system may then analyse the received plurality of bits (or function of the decoded plurality of bits) and may compare with the randomly generated bits that were encoded in the quantum information. The verifying system may also analyse the times at which the responses from the target apparatus were received. In this way, the verifying system may verify the location of the target apparatus. Additionally, in doing so, the verifying system has confirmed that the message m did originate from the location of the target, apparatus.

The security of position based authentication methods are discussed in the Annexe below.

With secure position-based authentication, secure position-based quantum key distribution immediately follows, and thus one can send messages that can only be decrypted by a party within region P. Accordingly the secure position verification protocols described above and the secure position based authentication protocols together imply secure quantum key distribution.

Variations of the described arrangements are envisaged, for example, the features of all of the disclosed arrangements may be combined in any way.

In the examples described above, no assumptions have been made about the location of the target apparatus. In an ideal case in which the target apparatus would be able to process all information from the verifying system and send a response instantaneously, the location can be a precise spacial location of the apparatus. However, verifying the location of a target apparatus may mean verifying that the target apparatus is located within a specified region of space. The region of space may be an area of any shape or configuration around the target apparatus. For example, if the verifying system attempts to communicate to the expected location of the target apparatus, and the target apparatus takes a time ε to process all information received from the verifying system and to formulate a response, then the verifying system is able to ascertain that the target apparatus is located within a sphere (or hypersphere) around the expected location of the target apparatus, with the radius of said sphere (or hypersphere) related to time ε.

As described earlier, the methods and systems described above may be applicable in any number of spacial dimensions. Additionally, as only an analysis of the time between the verifying system transmitting a plurality of signals to the expected location of the target apparatus and receiving a response from the target apparatus, and an analysis of the response from the target apparatus is required, the systems and methods described above may be applicable in flat spacetime or in curved spacetime.

In some of the examples described above, a communication device of the verifying system acted as a controller to coordinate transmissions of signals to the target apparatus, and to process responses received by the verifying system. However, the verifying system may comprise a controller configured to coordinate and control the activities of the communication devices. For example, the controller may be configured to communicate with the plurality of communication devices to coordinate transmissions of signals to the target apparatus. The controller may be configured to process all responses received by the verifying system and to control all communications over quantum channels. In some such scenarios, the communication devices may act solely as transmitters and receivers of classical and/or quantum information, distinguishable only by their relative positions in space. In such scenarios there may be no need for secure communication channels to be established amongst the plurality of communication devices so long as each communication device is able to communicate securely with the controller.

The plurality of communication devices may communicate with one another via one or more secure communication channels. For example, the secure communication channels may be used to coordinate the transmission of a plurality of signals to the target apparatus. The secure communication channels may be used to assist in synchronising timers at each of the communication devices. Timers may be synchronised via GPS (Global Positioning System).

The plurality of communication devices may be located at the same distance from the target apparatus or at different distances. The transmitting of the plurality of signals comprising information may comprise transmitting so as the plurality of signals arrive at the target apparatus within a time frame. The time frame may be substantially an instant in time.

The sending of quantum information to the target apparatus may comprise sending to the target apparatus, via the quantum communication channel, a plurality of quantum objects, wherein a plurality of bits are encoded in quantum states of the quantum objects. The quantum objects may be any suitable quantum objects and the quantum states may be any suitable quantum states. For example, the quantum states may comprise the polarisation states of photons. The quantum states may comprise the spin states of quantum particles. The quantum states may be stored in one or more quantum memory devices.

The sending of quantum information to the target apparatus may occur before, after, or at the same time as the transmitting of the plurality of signals to the target apparatus.

The quantum communication channel may comprise a quantum teleportation channel. For example, a communication device may share an entangled quantum state with the target apparatus. By performing a local operation on a part of the entangled state at the communication device, quantum information may be communicated to the target apparatus via quantum teleportation. Accordingly, in some cases no tangible quantum object is sent to the target apparatus through space and yet, on receipt of the plurality of signals from the verifying system, information may be decoded from a quantum state communicated via the quantum teleportation channel. Additionally or alternatively, the quantum communication channel can comprise a physical transfer of a tangible quantum object.

The quantum communication channel may be associated with one or more of the plurality of communication devices, as described above. However, there is no need for the quantum communication channel to be associated with one of the described communication devices that are capable of transmitting and receiving classical information to and from the target apparatus. For example, a plurality of signals may be sent to the target apparatus from one or more of a plurality of communication devices that are capable only of transmitting and receiving classical information, whereas the quantum communication channel may be associated with a quantum device of the verifying system, separate from the classical communication devices.

In the examples described above, a quantum communication channel is used to communicate quantum information from the verifying system to the target apparatus. A quantum communication channel may be used for two-way quantum communication. For example, after decoding a plurality of bits from quantum information, the target apparatus may then transmit a response related to the decoded plurality of bits to a plurality of communication devices of the verifying system via quantum communication channels.

As described above, a plurality of bits are encoded in the quantum information and the encoding of the plurality of bits is based on an output of a function of the information associated with the plurality of signals. The function may be a non-linear function. The function may be a cryptographic hash function. The function may be a composition of functions. The composition may contain, as a component, a linear function and as another component a non-linear function, so that the image of the linear function is the argument of the non-linear function. The non-linear function in this composition may be a cryptographic hash function. The linear function in this composition may be a bitwise XOR of its arguments.

The output of the function of the information associated with the plurality of signals may indicate a basis of measurement for measuring a quantum object. For example, the output of the function of the information associated with the plurality of signals may indicate a basis in which to polarise a photon.

The output of the function of the information may be used to indicate a time bin for the quantum information. For example, the output of the function may indicate to the target apparatus at which times a quantum state should be expected to be received via a quantum communication channel.

The receiving of the plurality of bits at two or more of the plurality of communication devices may comprise receiving the plurality of bits at communication devices that are not used for transmitting the signals comprising information.

The analysing of the response and the plurality of bits encoded in the communicated quantum information may comprise: comparing a received plurality of bits and the plurality of bits encoded in the quantum information; and determining from the comparison whether or not the received plurality of bits are from the target apparatus. The verifiers may allow a certain amount of error when comparing what is received from the target apparatus with what should have received from the target apparatus. The analysing of a time between the transmitting of the plurality of signals and the receiving of the response may comprise checking that the time is less than a bound. The bound may be determined based on assumptions of the distance from each verifier to the target apparatus, and processing times at the target apparatus. The analysing may take into account compensations for relativistic effects of special and general relativity theory.

At the target apparatus, the decoding of a plurality of bits from the quantum information may comprise measuring a quantum state of one or more of a plurality of quantum objects. The plurality of quantum objects may comprise photons and the quantum state may be the polarisation state of one or more photons. The decoding of a plurality of bits from the quantum information may comprise measuring a photon in a specific polarisation basis.

The sending of the response to two or more of a plurality of communication devices may comprise sending the response to a determined set of the plurality of devices. The sending of the response to two or more of a plurality of communication devices may be performed using the communication of quantum information. The response may comprise the decoded plurality of bits. The response may comprise information related to the decoded plurality of bits such as an output of a function of the decoded plurality of bits.

The communication devices may be transceivers arranged to send information to and receive information from the prover. The verification system may further comprise a controller for controlling the operation of the transceivers and the quantum state transmitter. The transceivers may form part of an existing established network such as a GPS system. It will be appreciated that in alternative arrangements the verification system may comprise a plurality of transmitters arranged to transmit information to the prover and a plurality of receivers arranged to receive information from the prover. The controller may be integrated with one of the transceivers. In addition, the quantum state transmitter may be integrated with one of the transceivers. The prover may be any suitable electronic apparatus for receiving information from and transmitting information to the transceivers. The prover may have the capability to receive quantum objects from the transceivers. Furthermore, the prover may comprise a separate receiving and transmitting device. The prover may be an object being located by the system. Alternatively, the prover may be apparatus associated with a particular object being located by the system.

It will be appreciated that the various methods described herein, or at least aspects thereof, may be implemented by a computer program. The computer program may include computer code arranged to instruct a computer to perform the functions of one or more of the various methods described above. The computer program and/or the code for performing such methods may be provided to an apparatus, such as a computer, on a computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

The above embodiments have been described by way of example only, and the described embodiments are to be considered in all respects only as illustrative and not restrictive. It will be appreciated that variations of the described embodiments may be made without departing from the scope of the invention which is indicated by the appended claims rather than by the foregoing description.

Annexe

Theorem and Proof Concerning One-Dimensional Position Verification

The reliability of the one-dimensional position verification method discussed above in relation to FIG. 5 is now demonstrated by way of a theorem and proof.

Theorem 1 (1D position verification) Assume $P_1^*$ and $P_2^*$ perform at most q queries to H. Then in an execution of $V_1$, $V_2$, $P_1^*$, $P_2^*$ with $V_1$, $V_2$ following the protocol described above, the probability that $V_1, V_2$ accept is at most $$2q2^{-l/2} + \left(2^{h(\gamma)} \frac{1+\sqrt{1/2}}{2}\right)^n.$$

Note, the probability is negligible if $\gamma \leq 0.037$ and n, l are superlogarithmic.

Proof. To prove this theorem, proceed using a sequence of games. The first game is the original protocol execution, and in the last game, one is able to show that Pr[Accept] is small. Here the event "$y_1=y_2$ and $\omega(y_1-\hat{y}) \leq \gamma n$" is abbreviated as "Accept".

Game 1 An execution as described in Theorem 1.

As a first step, use EPR pairs to delay the choice of the basis B. This is a standard trick that has been used in quantum key distribution proofs and other settings. By choosing B sufficiently late, one is able to argue that B is independent of the state of $P_1^*$ and $P_2^*$.

Game 2 As in Game 1, except that $V_1$ prepares n EPR pairs, with their first qubits in register X and their second qubits in Y. Then $V_1$ sends X at time t=0 instead of sending $|\Psi\rangle$. At time t=2, $V_1$ measures Y in basis $B:=H(x_1 \oplus x_2)$, the outcome is $\hat{y}$.

Note in particular that $V_1, V_2$ never query H before time t=2. (But $P_1^*, P_2^*$ might, of course.)

It is easy to verify (and well-known) that for any $B \in \{0,1\}$, preparing a qubit $X:=|y\rangle_B$ for random $y \in \{0,1\}$ is perfectly indistinguishable (when given X, y, B) from producing an EPR pair XY, and then measuring Y in bases B to get outcome y. Thus Pr[Accept:Game 1]=Pr[Accept:Game 2].

The problem now is that, although the time when the basis B is used has been delayed, the basis is still chosen early: At time t=0, the values $x_1, x_2$ are chosen, and those determine B via $B=H(x_1 \oplus x_2)$. Neither $P_1^*$ nor $P_2^*$ individually knows B, but that does not necessarily exclude an attack. One must hope that H is a sufficiently complex function such that computationally, B is "as good as unknown" before time t=1 (where $x_1$ and $x_2$ become known to both $P_1^*, P_2^*$). The next game transformation formalizes this:

Game 3 As in Game 1, except that at time t=1, the value $$B \xleftarrow{\$} \{0,1\}^n$$

is chosen, and the random oracle is reprogrammed to return $H(x_1 \oplus x_2)=B$ after t=1.

To clarify this, if $H_0:\{0,1\}^l \to \{0,1\}^n$ denotes a random function chosen at the very beginning of the execution, then at time $t \leq 1$, $H(x)=H_0(x)$ for all $x \in \{0,1\}^l$, while at time $t>1$, $H(x_0 \oplus x_1)=B$ and $H(x)=H_0(x)$ for all $x \neq x_0 \oplus x_1$.

Intuitively, the change between Games 2 and 3 cannot be noticed because before time t=1, the verifiers $V_1$ and $V_2$ never query $H(x_1 \oplus x_2)$, and the prover P and interceptors $P_1^*$ and $P_2^*$ cannot query $H(x_1 \oplus x_2)$ either: before time t, in no spacial location will the prover or interceptors have access to both $x_1$ and $x_2$.

Figure 12:
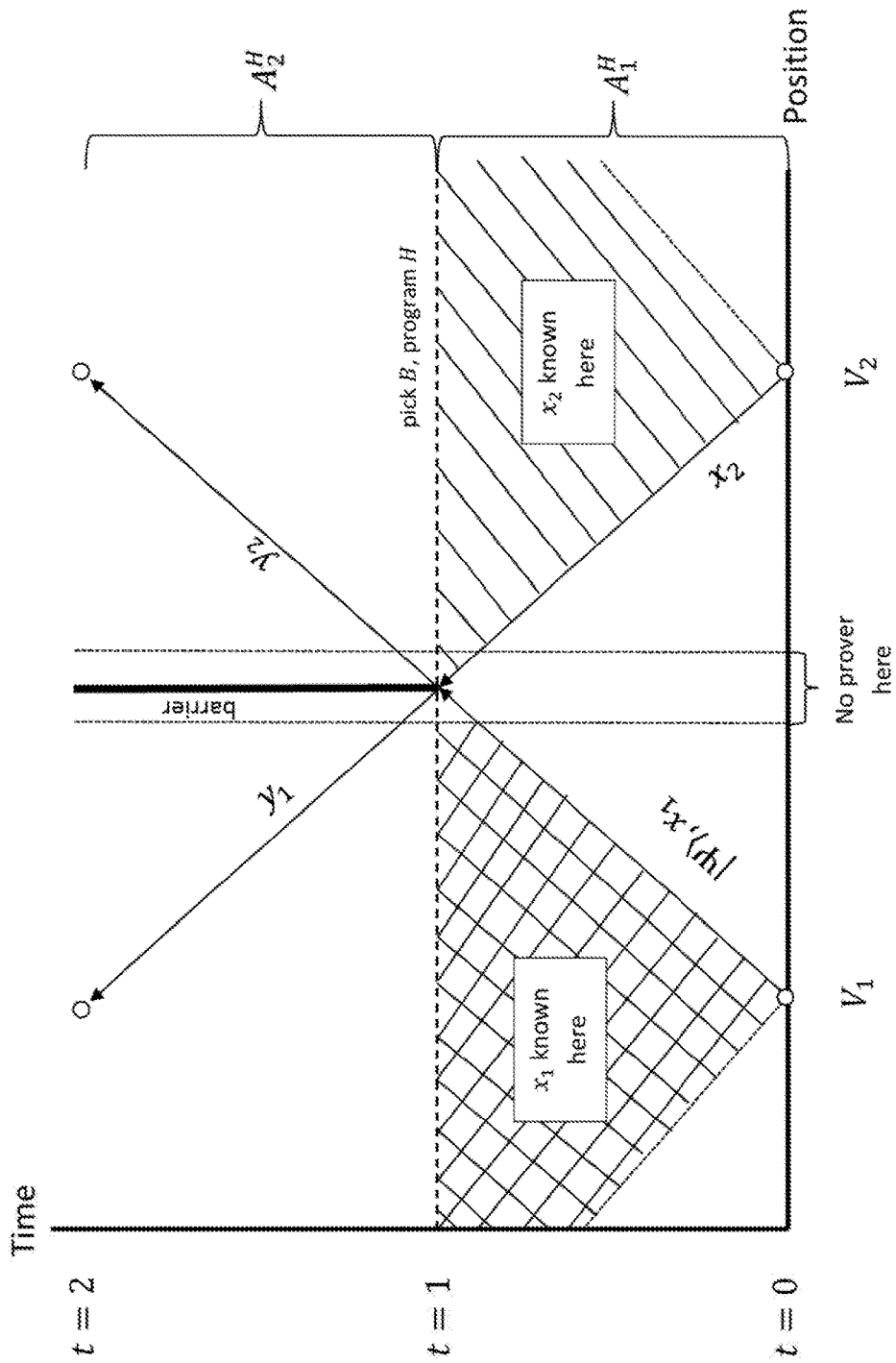
FIG. 12 shows a spacetime diagram.

This is illustrated in FIG. 12. The hatched areas represent where $x_1$ and $x_2$ are known respectively. Note that they do not overlap. The dashed horizontal line represents where the random oracle is programmed (t=1).

Purists may object that choosing B and programming the random oracle to return B at all locations in a single instant in time needs superluminal communication which in turn is known to violate causality and might thus lead to inconsistent reasoning. However, it will be shown later on that this issue will not arise because the whole protocol execution can be transformed into a non-relativistic quantum circuit and the programming of the random oracle can be performed in that circuit.

To prove that Games 2 and 3 are indistinguishable, use the following lemma.

Lemma 2 Let $H:\{0,1\}^l \to \{0,1\}^n$ be a random oracle. Let $(A_1, A_2)$ be oracle algorithms sharing state between invocations that perform at most q queries to H. Let $C_1$ be an oracle algorithm that on input (j,x) does the following: Run $A_1^H(x)$ till the j-th query to H, then measure the argument of that query in the computational basis, and output the measurement outcome. (Or $\perp$ if no j-th query occurs.) Let $$P_A^1 :=$$

$$Pr\left[b'=1: H \xleftarrow{\$} (\{0,1\}^l \to \{0,1\}^n), x \leftarrow \{0,1\}^l, A_1^H(x), b' \leftarrow A_2^H(x, H(x))\right]$$

$$P_A^2 := Pr\left[b'=1: H \xleftarrow{\$} (\{0,1\}^l \to \{0,1\}^n), x \leftarrow \{0,1\}^l,\right.$$

$$\left. B \xleftarrow{\$} \{0,1\}^n, A_1^H(x), H(x):=B, b' \leftarrow A_2^H(x, B)\right]$$

$$P_C := Pr\left[x=x': H \xleftarrow{\$} (\{0,1\}^l \to \{0,1\}^n), x \leftarrow \{0,1\}^l,\right.$$

$$\left. j \xleftarrow{\$} \{1, \ldots, q\}, x' \leftarrow C_1^H(j,x)\right]$$

Then $|P_A^1 - P_A^2| \leq 2q\sqrt{P_C}$.

In other words, an adversary can only notice that the random oracle is reprogrammed at position x if he can guess x before the reprogramming takes place.

To apply Lemma 2 to Games 2 and 3, let $A_1^H(x)$ be the machine that executes verifiers and provers from Game 2 until time t=1 (inclusive). When $V_1$ chooses $x_1, x_2$, $A_1^H(x)$ chooses $$x_1 \xleftarrow{\$} \{0,1\}^l \text{ and } x_2 := x \oplus x_1.$$

Let $A_2^H(x,B)$ be the machine that executes verifiers and provers after time t=1. When $V_1$ queries $H(x_1 \oplus x_2)$, $A_2^H$ uses the value B instead. In the end, $A_2^H$ returns 1 iff $y_1=y_2$ and $\omega(\hat{y}-y_1) \leq \gamma n$. (See FIG. 12 for the time intervals handled by $A_1^H, A_2^H$.) Since $V_1, V_2$ make no oracle queries except for $H(x_1 \oplus x_2)$, and since $P_1^*, P_2^*$ make at most q oracle queries, $A_1^H, A_2^H$ perform at most q queries.

By construction, $P_A^1$=Pr[Accept:Game 2]. And $P_A^2$=Pr[Accept:Game 3]. And $P_C$=Pr[x'=$x_1 \oplus x_2$:Game 4] for the following game:

Game 4 Pick $$j \xleftarrow{\$} \{1, \ldots, q\}.$$

Then execute Game 2 till time t=1 (inclusive), but stop at the j-th query and measure the query register. Call the outcome x'.

Since Game 4 executes only till time t=1, and since till time t=1, no gate can be reached by both $x_1, x_2$ (note: at time t=1, at position 0 both $x_1, x_2$ could be known, but no malicious interceptor may be at that location), the probability that $x_1 \oplus x_2$ will be guessed is bounded by $2^{-l}$. Hence $\Pr[x' = x_1 \oplus x_2 : \text{Game } 3] \le 2^{-l}$.

Thus by Lemma 2, one arrives at $$|Pr[\text{Accept:Game 2}] - Pr[\text{Accept:Game 3}]| = |P_A^1 - P_A^2| \le 2q\sqrt{P_C} \quad (5)$$

$$= 2q\sqrt{Pr[x' = x_1 \oplus x_2 : \text{Game 4}]} \le 2q2^{-l/2}.$$

Game 5 Like Game 3, except that for time t>1, a barrier is installed at position 0 (i.e., where the honest prover P would be) that lets no information through.

The barrier is illustrated in FIG. 12 with a thick vertical line.

Time t=1 is the latest time at which information from position 0 could reach the verifiers $V_1$, $V_2$ at time t≤2. Since the barrier is installed only for time t>1, whether the barrier is there or not cannot influence the measurements of $V_1$, $V_2$ at time t=2. And Accept only depends on these measurements. Thus Pr[Accept:Game 3]=Pr[Accept:Game 5].

Let ρ be the state of the execution of Game 5 directly after time t=1 (i.e., after the gates at times t≤1 have been executed). Then ρ is a threepartite state consisting of registers Y, L, R where Y is the register containing the EPR qubits which will be measured to give ŷ (cf. Game 2), and L and R are the quantum state left and right of the barrier respectively. Then ŷ is the result of measuring Y in basis B, and $y_1$ is the result of applying some measurement $M_1$ to L (consisting of all the gates left of the barrier), and $y_2$ is the result of applying some measurement $M_2$ to R. Notice that due to the barrier, $M_1$ and $M_2$ operate only on L and R, respectively, without interaction between those two.

Accordingly:

$$Pr[\text{Accept:Game 5}] = Pr\Big[y_1 = y_2 \text{ and } \omega(\hat{y} - y_1) \le \gamma n : B \xleftarrow{\$} \{0,1\}^n,$$
$$YLR \leftarrow \rho, \hat{y} \leftarrow M^B(Y), y_1 \leftarrow M_1(L), y_2 \leftarrow M_2(R)\Big]$$

where YLR←ρ means initializing YLR with state ρ. And $M^B$ is a measurement in bases B. And ŷ←$M^B$(Y) means measuring register Y using measurement $M^B$ and assigning the result to ŷ. And $y_1 \leftarrow M_1(L)$, $y_2 \leftarrow M_2(R)$ analogously.

The right hand side of this equation is a so-called monogamy of entanglement game, and is bounded by $$\left(2^{h(\gamma)}\frac{1 + \sqrt{1/2}}{2}\right)^n.$$

Thus $$Pr[\text{Accept: Game 5}] \le \left(2^{h(\gamma)}\frac{1 + \sqrt{1/2}}{2}\right)^n.$$

From equation (5) and the equalities between games, one finds that $|Pr[\text{Accept:Game 1}] - Pr[\text{Accept:Game 5}]| \le 2q2^{-l/2}$.

Thus altogether $$Pr[\text{Accept: Game 1}] \le 2q2^{-l/2} + \left(2^{h(\gamma)}\frac{1 + \sqrt{1/2}}{2}\right)^n. \qquad \square$$

Accordingly, Theorem 1 is proven.

Theorem and Proof Concerning Position Verification in Two or More Dimensions

The security of position verification systems in two or higher dimensions is shown below. The following makes use of the idea of circuits in spacetime.

Spacetime is the set of all locations in space and time. That is, intuitively spacetime consists of all tuples (t, $x_1, \ldots, x_n$) where t is the time and $x_1, \ldots, x_n$ is the position in space. Such a location in spacetime is called an event. Relativity theory predicts that there is no natural distinction between the time coordinate t and the space coordinates $x_1, \ldots, x_n$. (In a similar way as in "normal" space there is no reason why three particular directions in space are coordinates.) As it turns out, for analyzing the position verification protocol, we do not need to know the structure of spacetime, so in the following spacetime will just be some set of events, with no particular structure. Spacetime is assumed to be a Lorentzian manifold which is time-orientable (otherwise the notions of causal future/past would not make send) without closed causal curves (at least in the spacetime region where the protocol is executed; otherwise quantum circuits may end up having loops).

The geometry of spacetime (to the extent needed here) is described by a partial order on the events: It is said that x causally precedes y (x ≺ y) iff information originating from event x can reach event y. Or in other words, if one can get from x to y travelling at most the speed of light. In flat spacetime, this relation is familiar: $(t_x, x_1, \ldots, x_n) \prec (t_y, y_1, \ldots, y_n)$ iff $t_x \le t_y$ and $\|(x_1, \ldots, x_n) - (y_1, \ldots, y_n)\| \le t_y - t_x$.

Given this relation, one can define the causal future $C^+(x)$ of an event x as the set of all events reachable from x, $C^+(x) := \{y : x \prec y\}$. Similarly, one defines the causal past $C^-(x) := \{y : y \prec x\}$.

In the case of flat spacetime, the causal future of x=(t, $x_1, \ldots, x_n$) is an infinite cone with its point at x and extending towards the future. Thus it is also called a future light cone. Similarly the causal past of x is an infinite cone with its point at x extending into the past.

This language allows one to express quantum computations in space that do not transfer information faster than light. A spacetime circuit is a quantum circuit where every gate is at a particular event. There can only be a wire from a gate at event x to a gate at event y if x causally precedes y (x ≺ y). Note that since ≺ is a partial order and thus antisymmetric, this ensures that a circuit cannot be cyclic. Note further that there is no limit to how much computation can be performed in an instant since ≺ is reflexive. One can model interceptors that are not at the location of an honest prover by considering circuits with no gates in P, where P is a region in spacetime. (This allows for more finegrained specifications than, for example, just saying that the interceptor is not within δ distance of the honest prover. For example, P may only consist, of events within a certain time interval; this would mean that the interceptor is allowed to be at any space location outside that time interval.) Notice that a spacetime circuit is also just a normal quantum circuit if one forgets where in spacetime gates are located. Thus transformations on quantum circuits (such as changing the execution order of commuting gates) can also be applied to spacetime circuits. The result will be a valid circuit, though possibly not a spacetime circuit any more.

Position verification can accordingly be defined using the language of spacetime circuits.

Definition 3 (Sound position verification) Let P be a region in spacetime. A position verification protocol is sound for P iff for any non-uniform polynomial-time spacetime circuit P* that has no gates in P, the following holds: In an interaction between the verifiers and P*, the probability that the verifiers accept (the soundness error) is negligible.

Non-uniform polynomial-time means that one considers a family of circuits of polynomial size in the security parameter, consisting only of standard gates (from some fixed universal set) and oracle query gates. In addition, it is assumed that the circuit is given an (arbitrary) initial quantum state that does not need to be efficiently computable.

The smaller the region P is, the better the protocol localizes the prover. Informally, one can say that the protocol has higher precision if P is smaller.

Next, a generalisation of position verification in any number of dimensions is described using the language of spacetime circuits, and the security of the generalised protocol is shown. In this generalization, only two of the verifiers check whether the answers of the prover are correct.

Let P be a prover, and $P^o$ an event in spacetime ($P^o$ specifies where and when the honest prover performs its computation). Let $V_1, \ldots, V_r$ be verifiers. Let $V_1^+, \ldots, V_r^+$ be events in spacetime that causally precede $P^o$. ($V_i^+$ specifies where and when the verifier $V_i$ sends its challenge.) Let $V_1^-, V_2^-$ be events in spacetime such that $P^o$ causally precedes $V_1^-, V_2^-$. ($V_i^-$ specifies where and when $V_i$ expects the prover's response.)

Let n (number of qubits) and l (bit length of classical challenges) be integers, and $0 \leq \gamma < \frac{1}{2}$ (fraction of allowed errors). Let H: $\{0,1\}^l \to \{0,1\}^n$ be a hash function (modeled as a quantum random oracle). The verifiers choose uniform $x_1, \ldots, x_r \in \{0,1\}^l$, $\hat{y} \in \{0,1\}^n$, by communicating over secure channels. At some event that causally precedes $P^o$, $V_0$ sends $|\Psi\rangle$ to P. Here B:=H($x_1 \oplus x_2$), $|\Psi\rangle := |\hat{y}\rangle_B$. For i=1, ..., r: $V_r$ sends $x_r$ to P at event $V_r^+$. At event $P^o$, P will have $|\Psi\rangle$, $x_1, \ldots, x_r$. Then P computes B:=H($x_1 \oplus \ldots \oplus x_r$), measures $|\Psi\rangle$ in basis B to obtain outcome $y_1$, and sends $y_1$ to $V_1$ and $y_2:=y_1$ to $V_2$. At events $V_1^-, V_2^-$, $V_1$ and $V_2$ receive $y_1, y_2$.

Using secure channels, the verifiers check whether $y_1 = y_2$ and $\omega(y_1 - \hat{y}) \leq \gamma n$. If so (and $y_1, y_2$ indeed arrived at $V_1^-, V_2^-$), the verifiers accept.

In the protocol description, for simplicity it is assumed that $V_1, V_2$ are the receiving verifiers. However, there is no reason not to choose other two verifiers, or even additional verifiers not used for sending. Similarly, $|\Psi\rangle$ could be sent by any verifier, or by an additional verifier. In the analysis, only the events at which different messages are sent/received have been used. Information concerning which verifier sends which message has not been used.

Note that this protocol also allows for realistic provers that cannot perform instantaneous computations: In this case, one chooses the events $V_1^-, V_2^-$ such that the prover's messages can still reach them even if the prover sends $y_1, y_2$ with some delay.

The main security result is now stated:

Theorem 4 Assume that $\gamma \leq 0.037$ and n, l are superlogarithmic.

Then the PV protocol described above is sound for P:=$\bigcap_{i=1}^r C^+(V_i^+) \cap C^-(V_1^-) \cap C^-(V_2^-)$. (In words: There is no event in spacetime outside of P at which one can receive the messages $x_i$ from all $V_i$, and send messages that will be received in time by $V_1, V_2$.)

Concretely, if the malicious prover performs at most q oracle queries, then the soundness error is at most $$v := \left(2^{h(\gamma)} \frac{1+\sqrt{1/2}}{2}\right)^n + 2q2^{-l/2}.$$

Actually, it is sufficient if the number of queries performed by gates inside $C_1^- \cup C_2^-$ is bounded by q. In particular, oracle queries after both verifiers have received $y_1, y_2$ do not count (as expected).

Notice that the condition on the locations of the provers is tight: If $E \in \bigcap_{i=1}^r C^+(V_i^+) \cap C^-(V_1^-) \cap C^-(V_2^-) \setminus P \neq \emptyset$, then the protocol could even be broken by an adversary with a single interceptor device: P* could be at event E, receive $x_1, \ldots, x_r$, compute $y_1, y_2$ honestly, and send them to $V_1, V_2$ in time. The same reasoning applies to any, protocol where only two verifiers receive. The present protocol is thus optimal in terms of precision under all such protocols.

Proof of Theorem 4. In the following, $C_i^+$ is shorthand for $C^+(V_i^+)$ and $C_i^-$ is shorthand for $C^-(V_i^-)$. For notational convenience $\cap$ denotes $\bigcap_{i=1}^r$. The precondition of the theorem then becomes: $\cap C_i^+ \cap C_1^- \cap C_2^- \subseteq P$. Let Ω denote all of spacetime.

The gates in the spacetime circuit P* are partitioned into several disjoint sets of gates (subcircuits), depending on where they are located in spacetime. For each subcircuit, a rough intuitive meaning is also given; these meanings are not precisely what the subcircuits do but help to guide the intuition in the proof.

| Subcircuit | Region in spacetime | Intuition |
|---|---|---|
| $P_{pre}*$ | $(C_1^- \cup C_2^-) \setminus \cap C_i^+$ | Precomputation |
| $P_P*$ | $\cap C_i^+ \cap C_1^- \cap C_2^-$ | Gates in P (empty) |
| $P_1*$ | $\cap C_i^+ \cap C_1^- \setminus C_2^-$ | Computing $y_1$ |
| $P_2*$ | $\cap C_i^+ \cap C_2^- \setminus C_1^-$ | Computing $y_2$ |
| $P_{post}*$ | $\Omega \setminus C_1^- \setminus C_2^-$ | After protocol end |

Note that all of the subcircuits are disjoint, and their union is all of Ω. The subcircuits have analogues in the proof in the one-dimensional case. $P_{pre}^*$ corresponds to the gates below the dashed line in FIG. 12; $P_1^*$ to the gates above the dashed line and left of the barrier; $P_2^*$ above the dashed line and right of the barrier; $P_{post}^*$ to everything that is above the picture. This correspondence is not exact because the dashed line needs to be replaced by a surface S which is not flat. In the present notation, S is the border between $P_{pre}^*$ and the other subcircuits.

In addition, in some abuse of notation, by $V_1$ one denotes the circuit at $V_1^-$ that receives $y_1$. By $V_2$ one denotes the circuit at $V_2^-$ that receives $y_2$.

By the definition of spacetime circuits provided above, there can only be a wire from gate $G_1$ to gate $G_2$ if $G_1,G_2$ are at events $E_1$, $E_2$ with $E_1 \prec E_2$ ($E_1$ causally precedes $E_2$). Thus, by the definition of causal futures and the transitivity of $\prec$, there can be no wire leaving $C_i^+$. Similarly, there can be no wire entering $C_i^-$. These two facts are sufficient to check the following facts:

$$P_1^*, P_2^*, P_{post}^* \xrightarrow{\not\to} P_{pre}^*, P_1^* \xrightarrow{\not\to} P_2^*, P_2^* \xrightarrow{\not\to} P_1^*,$$
$$P_1^* \xrightarrow{\not\to} V_2, P_2^* \xrightarrow{\not\to} V_1, P_{post}^* \xrightarrow{\not\to} P_1^*, P_2^*, V_1, V_2. \quad (6)$$

Here $A \xrightarrow{\not\to} B$ means that there is no wire from subcircuit A to subcircuit B.

Figure 13:
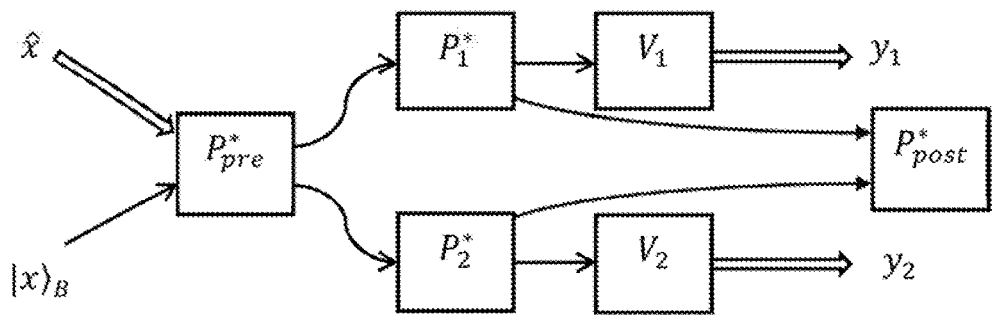
FIG. 13 shows a spacetime circuit.

Given these subcircuits, one can write the execution of the protocol as the quantum circuit shown in FIG. 13.

In FIG. 13, $\vec{x}$ stands for $x_1, \ldots, x_r$. The wires between subcircuits that are in the transitive hull of the wires drawn have been omitted for clarity. For example, there could be a wire from $P_{pre}^*$ to $V_1$, but this has not been drawn as wires from $P_{pre}^*$ to $P_1^*$ to $V_1$ are present. Note that $P_p^*$ does not occur in this circuit, because it contains no gates (it consists of gates in $\cap C_i^+ \cap C_1^- \cap C_2^- = P$ which by assumption contains no gates).

From Equation (6) it follows that no wires are missing in FIG. 13. In particular, Equation (6) implies that the quantum circuit is well-defined. If one did not have, for example, $P_1^* \xrightarrow{\not\to} P_{pre}^*$, there may be wires between $P_1^*$ and $P_{pre}^*$ in both directions and the result would not be a quantum circuit. The arrow heads in Equation (6) have only been added to stress that the wires indeed go in the correct directions. Below, the usual left-to-right convention in quantum circuits is followed and arrowheads are omitted.

The circuit, shown in FIG. 13 now encodes all information dependencies that are needed and the circuit of FIG. 13 can be treated as a normal quantum circuit.

In this way, the protocol execution can be analysed using a sequence of games. The original execution can be written as follows:

Game 1 (Protocol execution) Pick $$x_1, \ldots, x_r \xleftarrow{\$} \{0,1\}^l, \hat{y} \xleftarrow{\$} \{0,1\}^n, H \xleftarrow{\$} \text{Fun}$$

where Fun is the set of functions $\{0,1\}^l \to \{0,1\}^n$. Let $B := H(x_1 \oplus \ldots \oplus x_r)$. Execute the circuit shown in FIG. 13 resulting in $y_1, y_2$. Let accept:=1 iff $y_1 = y_2$ and $\omega(y_1 - \hat{y}) \leq \gamma n$.

To prove the theorem, one needs to show that $\Pr[\text{accept}=1:\text{Game 1}] \leq v$.

As in the proof of the one dimensional case, the choice of $\vec{x}$ is delayed by using EPR pairs, and the subcircuit $P_{post}^*$, which clearly has no effect on the outputs $y_1, y_2$, is removed.

Game 2 (Using EPR pairs) Pick $$x_1, \ldots, x_r \xleftarrow{\$} \{0,1\}^l, H \xleftarrow{\$} \text{Fun}$$

Let $B := H(x_1 \oplus \ldots \oplus x_r)$. Execute the circuit of FIG. 14 resulting in $y_1, y_2$.

Let accept:=1 iff $y_1 = y_2$ and $\omega(y_1 - \hat{y}) \leq \gamma n$.

Here $|epr\rangle$ is the state consisting of n EPR pairs, i.e., $|epr\rangle = 2^{-n/2} \sum_{x \in \{0,1\}^n} |x\rangle \otimes |x\rangle$. The top and bottom wire originating from $|epr\rangle$ represent the first and last n qubits, respectively. $M^B$ is the gate that measures n qubits in bases $B \in \{0,1\}^n$. The wiggly line of FIG. 14 can be ignored for now.

As in the one-dimensional case, one can use the fact that preparing a qubit $X := |y\rangle_B$ for random $y \in \{0,1\}$ is perfectly indistinguishable (when given X, y, B) from producing an EPR pair XY, and then measuring Y to get outcome y. Thus $\Pr[\text{accept}=1:\text{Game 1}] = \Pr[\text{accept}=1:\text{Game 2}]$.

Again as in the one-dimensional case, the random oracle is reprogrammed. That is, instead of computing $B := H(x_1 \oplus \ldots \oplus x_r)$, one picks $$B \xleftarrow{\$} \{0,1\}^n$$

at some point in the execution and then programs the random oracle via $H(x_1 \oplus \ldots \oplus x_r) := B$. The question is: at which point should one program the random oracle? In the one-dimensional case, the fact that before time t=1 (dashed line in FIG. 12), there is no event at which both $x_1$ and $x_2$ are known was used. An analogous reasoning can be done in the present setting: since $P_{pre}^*$ consists only of gates outside $\cap C_i^+$, it means that any gate in $P_{pre}^*$ is outside some $C_i^+$ and thus does not have access to $x_i$. (This will formally be proven later on in this document) Accordingly, it is expected that left of the wiggly line in FIG. 14, $H(x_1 \oplus \ldots \oplus x_r)$ occurs with negligible probability only.

Formally, Lemma 2 is applied. Given a function H and values x, B, let $H_{x \mapsto B}$ denote the function identical to H, except that $H_{x \mapsto B}(x) = B$. Let $A_1^H(x)$ denote the oracle machine that picks $$x_1, \ldots, x_{r-1} \xleftarrow{\$} \{0,1\}^l$$

and sets $x_r := x \oplus x_1 \oplus \ldots \oplus x_{r-1}$ and prepares the state $|epr\rangle$ and then executes $P_{pre}^*$. Let $A_2^H(x,B)$ denote the oracle machine that, given the state from $A_1^H$, executes $P_1^*$, $P_2^*$, $V_1$, $V_2$, $M^B$ with oracle access to $H_{x \mapsto B}$ instead of H, sets accept:=1 iff $y_1 = y_2$ and $\omega(y_1 - \hat{y}) \leq \gamma n$, and returns accept. Let $C_1$, $P_A^1$, $P_A^2$, $P_C$ be defined as in Lemma 2. Then by construction, $P_A^1 = \Pr[\text{accept}=1:\text{Game 2}]$ (using the fact that $H = H_{x \mapsto H(x)}$). And $P_A^2 = \Pr[\text{accept}=1:\text{Game 3}]$ for the following game:

Game 3 (Reprogramming H) Pick $$x_1, \ldots, x_r \xleftarrow{\$} \{0,1\}^l, H \xleftarrow{\$} \text{Fun}.$$

Figure 14:
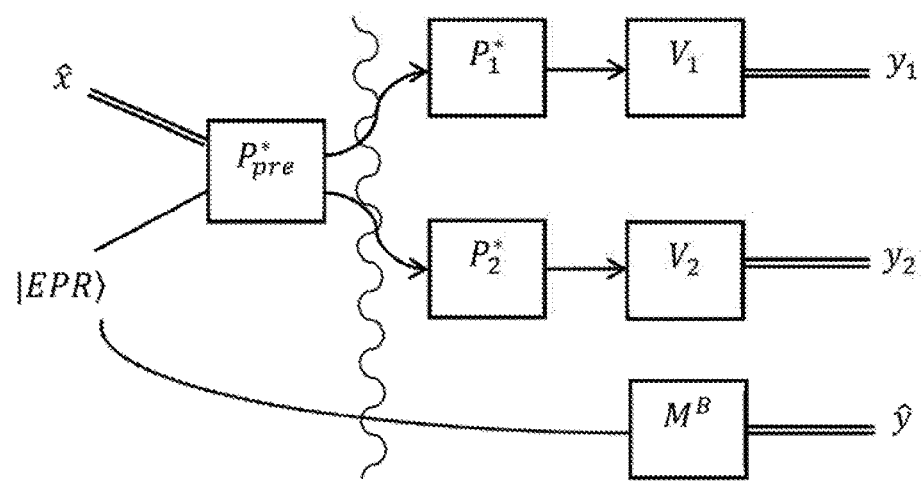
FIG. 14 shows a spacetime circuit.

Execute the circuit shown in FIG. 14 until the wiggly line (with oracle access to H). Pick $$B \xleftarrow{\$} \{0,1\}^n.$$

Execute the circuit shown in FIG. 14 after the wiggly line (with oracle access to $H_{x' \mapsto B}$) resulting in $y_1$, $y_2$, $\hat{y}$. Let accept:=1 iff $y_1 = y_2$ and $\omega(y_1 - \hat{y}) \leq \gamma n$.

And finally $P_C = \Pr[x' = x_1 \oplus \ldots \oplus x_r : \text{Game 4}]$ for the following game:

Game 4 (Guessing $x_1 \oplus \ldots \oplus x_r$) Pick $$x_1, \ldots, x_r \xleftarrow{\$} \{0,1\}^\ell, H \xleftarrow{\$} \text{Fun}, j \xleftarrow{\$} \{1, \ldots, q\}.$$

Prepare $|epr\rangle$ and execute circuit $P_{pre}^*$ until the j-th query to H. Measure the argument x' of that query.

By Lemma 2, one can see that $|P_A^1 - P_A^2| \leq 2q\sqrt{P_C}$. Thus, abbreviating $x = x_1 \oplus \ldots \oplus x_r$ as guessX, $$|\Pr[\text{accept}=1:\text{Game 2}] - \Pr[\text{accept}=1:\text{Game 3}]| \leq 2q \sqrt{\Pr[\text{guessX}:\text{Game4}]}. \quad (7)$$

Game 3 is now focussed on. Let $\rho_{YLR}$ denote the state in the circuit of FIG. 14 at the wiggly line (for random $x_1, \ldots, x_r$, H). Let L refer to the part of $\rho_{YLR}$ that is on the wires entering $P_1^*$, and R refer to the part of $\rho_{LR}$ on the wires entering $P_2^*$. Let Y refer to the lowest wire (containing EPR qubits). Notice that the situation from the one dimensional case has now been reproduced, in which space is split into two separate registers R and L, and the computation of $y_1, y_2$ is performed solely on R, L, respectively. For given B, let $M_L(B)$ be the POVM operating on L consisting of $P_1^*$ and $V_1$. ($M_L$ can be modeled as a POVM because $P_1^*$ and $V_1$ together return only a classical value and thus constitute a measurement.) Let $M_R(B)$ be the POVM operating on R consisting of $P_2^*$ and $V_2$. Game 3 can then be written as:

Game 5 (Monogamy game) Prepare $\rho_{YLR}$.

Pick $B \xleftarrow{\$} \{0,1\}^n$.

Apply measurement $M_L(B)$ to L, resulting in $y_1$. Apply measurement $M_R(B)$ to R, resulting in $y_2$. Measure Y in basis B, resulting in $\hat{y}$. Let accept:=1 iff $y_1 = y_2$ and $\omega(y_1 - \hat{y}) \leq \gamma n$.

Then $\Pr[\text{accept}=1:\text{Game 3}] = \Pr[\text{accept}=1:\text{Game 5}]$. Furthermore, Game 5 is again a monogamy of entanglement game, and $$\Pr[\text{accept} = 1: \text{Game 5}] \leq \left( 2^{h(\gamma)} \frac{1 + \sqrt{1/2}}{2} \right)^n.$$

Combining this with the equalities between games derived so far, and with (7), one obtains $$\Pr[\text{accept} = 1: \text{Game 1}] \leq \quad (8)$$

$$\left( 2^{h(\gamma)} \frac{1 + \sqrt{1/2}}{2} \right)^n + 2q\sqrt{\Pr[\text{guessX}: \text{Game 4}]}.$$

It remains to analyze Game 4. The intuition is that each oracle query performed by $P_{pre}^*$ will be out of reach of one of the $x_i$, and thus unable to query $H(x_1 \oplus \ldots \oplus x_r)$. To formalize this, consider the j-th oracle query gate in $P_{pre}^*$, and denote with $E_j$ the event at which that gate is located. Since $P_{pre}^*$ is contained in the complement of the spacetime region $\cap C_i^+$, for any $j \in \{1, \ldots, q\}$, there is an i such that $E_j \notin C_i^+$. (This formalizes the fact that $E_j$ cannot be reached by $x_i$.) Thus one can partition $\{1, \ldots, q\}$ into disjoint sets $J_i$ (i=1, \ldots, r) such that for all $j \in J_i$ one has $E_j \notin C_i^+$. Let Game $4_i$ denote Game 4 with the only difference that one picks $j \leftarrow J_i$ instead of $j \leftarrow \{1, \ldots, q\}$. Then $$\Pr[\text{guessX}: \text{Game 4}] = \sum_{i=1}^{r} \frac{|J_i|}{q} \Pr[\text{guessX}: \text{Game } 4_i]. \quad (9)$$

Let $P_{low}^i$ be the subcircuit of $P_{pre}^*$ not contained in $C_i^+$, and $P_{high}^i$ the subcircuit of $P_{pre}^*$ contained in $C_i^+$. Intuitively, $P_{low}^i$ has no access to $x_i$, but $P_{high}^i$ has. Since no wire can leave $C_i^+$, there is no wire from $P_{high}^i$ to $P_{low}^i$. That is, executing $P_{pre}^*$ is equivalent to first executing $P_{low}^i$ and then $P_{high}^i$. Furthermore, for any $j \in J_i$, the j-th query gate is outside $C_i^+$ and thus in $P_{low}^i$. Hence, executing $P_{pre}^*$ until the j-th query (for $j \in J_i$) is equivalent to executing $P_{low}^i$ until the j-th query, $P_{high}^i$ will never be executed. Thus one can rewrite Game $4_i$ as:

Game $6_i$ (Executing $P_{low}^i$ only) Pick $$x_1, \ldots, x_r \xleftarrow{\$} \{0,1\}^\ell, H \xleftarrow{\$} \text{Fun}, j \xleftarrow{\$} J_i.$$

Prepare $|epr\rangle$ and execute circuit $P_{low}^i$ until the j-th query to H. Measure the argument $x^j$ of that query.

Then $\Pr[\text{guessX}: \text{Game } 4_i] = \Pr[\text{guessX}: \text{Game } 6_i]$. Finally, note that $x_i$ is sent by $V_i$ at event $V_i^+ \in C_i^+$. So $x_i$ may be accessed in $P_{high}^i$, but not in $P_{low}^i$. Thus in Game $6_i$, $x_i$ is chosen uniformly random from $\{0,1\}^\ell$ but never accessed. Thus $\Pr[\text{guessX}: \text{Game } 6_i] = \Pr[x^j = x_1 \oplus \ldots \oplus x_r: \text{Game } 6_i] \leq 2^{-\ell}$. Hence $$\Pr[\text{guessX}: \text{Game 4}] \stackrel{(9)}{=} \sum_{i=1}^{r} \frac{|E_i|}{q} \Pr[\text{guessX}: \text{Game } 4_i] \leq 2^{-\ell} \sum_{i=1}^{r} \frac{|E_i|}{q} = 2^{-\ell}.$$

With inequality (8) one obtains $$\Pr[\text{accept} = 1: \text{Game 1}] \leq \left( 2^{h(\gamma)} \frac{1 + \sqrt{1/2}}{2} \right)^n + 2q 2^{-\ell/2} = \nu.$$

Numerically, it is possible to verify that for $\gamma \leq 0.037$, one finds $$2^{h(\gamma)} \frac{1 + \sqrt{1/2}}{2} < 1$$

and thus ν is negligible (for superlogarithmic n,l and polynomially bounded q).

Accordingly, Theorem 4 is proven.

Theorem 4 tells us where in spacetime a prover can be located to successfully verify its location (Region P.) However, the theorem is quite general; it is not immediate what this means in the concrete setting of flat spacetime.

Accordingly, specialized criteria are now derived for the case of flat spacetime and are used to show that Theorem 4 implies that a prover can be precisely localized by verifiers arranged in a tetrahedron.

By Theorem 4, the position verification scheme guarantees that the prover is within spacetime region $P:=\bigcap_{i=1}^{r} C^+(V_i^+) \cap C^-(V_1^-) \cap C^-(V_2^-)$. Or in words: the prover is at a point where he can receive $x_1, \ldots, x_r$ and send $y_1, y_2$ in time to be received by $V_1, V_2$. (In other words, even with several devices, the prover cannot do better than with a single device.) But what does this mean concretely? What is the precision (i.e., the size of P) in concrete use cases?

Figure 15:
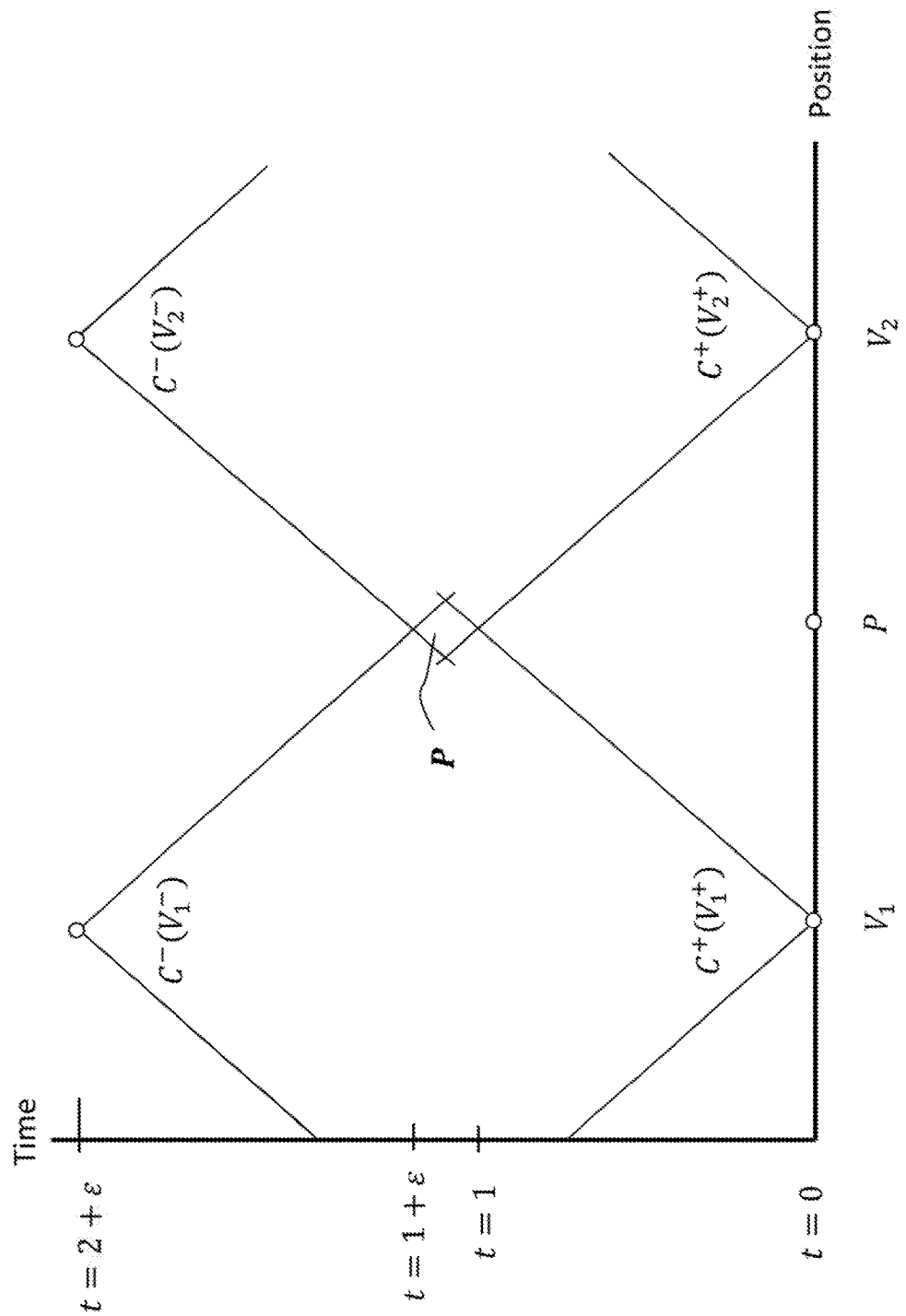
FIG. 15 shows a spacetime diagram.

For the one-dimensional case discussed above, it is easy to compute P. $V_1$, $V_2$ are located at positions $-1$, $1$ and send $x_1, x_2$ at time $t=0$, and expect $y_1, y_2$ at time $t=2$. Flat spacetime is assumed and thus $C^+((x_0,t_0))=\{(x,t):|x-x_0|\leq t-t_0\}$ and $C^-((x_0,t_0))=\{(x,t):|x-x_0|\leq t_0-t\}$. Hence $P=C^+((-1,0)) \cap C^+((1,0)) \cap C^-((-1,2)) \cap C^-((1,2))=\{(0,1)\}$. I.e., in the one-dimensional case it is guaranteed that the prover is at position 0 (at time $t=1$), which gives an alternate proof of Theorem 1. The case in which the verifiers give the honest, prover additional response time $\varepsilon$ to account for the fact that a real prover cannot respond instantaneously can be considered. In this case the verifiers expect the answer at time $2+\varepsilon$, and $P=\{(x,t):|x|\leq (t-1) \wedge |x|\leq (1+\varepsilon-t)\}$, thus the protocol verifies that the prover is in the space interval $[-\varepsilon,\varepsilon]$. (see FIG. 15.)

In the three dimensional case, computing P is more complicated. The following corollary gives a characterization in flat spacetime.

Corollary 5 (Soundness in flat spacetime) Assume flat spacetime (any dimension). Assume that $\gamma \leq 0.037$ and n,l are superlogarithmic.

Given two points x,y in space and a real number d, let $E(x, y, d):=\{z:\|z-x\|+\|z-y\|\leq d\}$. (I.e., E denotes an ellipsoid with foci x,y.).

Assume that $V_i$ sends at time $t_i^+$ and space $x_i^+$, and expects the response at time $t_i^-$ and space $x_i^-$ in the PV scheme described above. Then that PV scheme is sound for $P:=P_{space} \times \mathbb{R}$ with $$P_{space} = \bigcap_{\substack{i=1,\ldots,r \\ j=1,2}} E(x_i^+, x_j^-, t_j^- - t_i^+).$$

(That is, the scheme proves that the prover is in the spacial region $P_{space}$.)

This corollary simplifies the computation of the location of the prover. For example, in three-dimensional space, with $r=4$, one needs only to compute the intersection of 8 ellipsoids (e.g., numerically).

Proof of Corollary 5. In the following, let i always range over $1, \ldots, r$ and j over $1, 2$. Let, $P_{space}:=\{x:(x,t) \in P\}$ where P is as in Theorem 4. That is, $P_{space}$ is the projection of P from spacetime into space. To show the corollary, by Theorem 4 it is then sufficient to show that $P_{space} = \bigcap E(x_i^+, x_j^-, t_j^- - t_i^+)$. For any z one finds:

$z \in P_{space}$ iff $\exists t:(z,t) \in P = \bigcap_i C^+((x_i^+, t_i^+)) \cap \bigcap_j C^-((x_j^-, t_j^-))$ iff $\exists t:(\forall i: \|x_i^+ - z\| \leq t - t_i^+) \wedge (\forall j: \|x_j^- - z\| \leq t_j^- - t)$ iff $\exists t:(\max_i \|x_i^+ - z\| + t_i^+ \leq t) \wedge (\max_j \|x_j^- - z\| - t_j^- \leq -t)$ iff $(\max_i \|x_i^+ - z\| + t_i^+) + (\max_j \|x_j^- - z\| - t_j^-) \leq 0$ iff $\max_{i,j} \|x_i^+ - z\| + t_i^+ + \|x_j^- - z\| - t_j^- \leq 0$ iff $\forall i,j: \|x_i^+ - z\| + \|x_j^- - z\| \leq t_j^- - t_i^+$ iff $z \in \bigcap_{i,j} E(x_i^+, x_j^-, t_j^- - t_i^+)$.

This corollary allows one to analyze particular settings, but it does not give any immediate insight as to whether one gets nontrivial $P_{space}$ when doing so. The following lemma shows that, at least for a specific setup and for provers who answer instantaneously, this is not the case: the prover is localized perfectly.

Corollary 6 Assume flat spacetime. Assume that the verifiers $V_1, \ldots, V_4$ are on the vertices of a regular tetrahedron, and that the honest prover P is in the center of that tetrahedron. $V_1, \ldots, V_4$ send $x_1, \ldots, x_4$ at the same time $t^+$, and $V_1, V_2$ expect the answers at time $t^-:=t^++2R$ where R is the distance between $V_i$ and P. (That is, $V_1, V_2$ expect instantaneous responses.)

Then the PV scheme described above is sound for $P:=\{P\} \times \mathbb{R}$, i.e., the prover is indeed guaranteed to be at location P.

Proof. Without loss of generality, one can assume that $P=0$ and $R=1$. Let $V_1, \ldots, V_4$ be the vertices of the tetrahedron (and therefore the locations of the verifiers). By Corollary 5, all one needs to show is that $$P_{space} := \bigcap_{\substack{i=1,\ldots,4 \\ j=1,2}} E(V_i, V_j, 2) = \{0\}.$$

Assume this is not the case. Let $P^* \in P_{space} \setminus \{0\}$. Since $P_{space}$ is convex, $\varepsilon P^* \in P_{space}$ for all $\varepsilon \in [0,1]$.

Let $f_{ij}(z):=\|z-V_i\|+\|z-V_j\|-2$. Then $z \in E(V_i, V_j, 2)$ iff $f_{ij}(z) \leq 0$. One finds that $f_{ij}(0)=0$ for all i, j.

Since $f_{ij}$ is differentiable at 0, one has $$\frac{\partial f_{ij}(\varepsilon P^*)}{\partial \varepsilon}\bigg|_{\varepsilon=0} = \nabla f_{ij} \cdot P^*$$

where $\cdot$ is the inner product, and $\nabla f_{ij}$ the gradient of $f_{ij}$. Furthermore, by symmetry (or direct calculation), it is clear that $\nabla f_{ij} \propto -(V_i+V_j)/2 =: -V_{ij}$. (Here $x \propto y$ means $x=\alpha y$ for some $\alpha > 0$.) For all $i=1,\ldots,4$, $j=1,2$, and $\varepsilon \in [0,1]$, one has $\varepsilon P^* \in E(V_i, V_j, 2)$ and thus $f_{ij}(\varepsilon P^*) \leq 0$. Together with $f_{ij}(0)=0$ this implies that $$0 \geq \frac{\partial f_{ij}(\varepsilon P^*)}{\partial \varepsilon}\bigg|_{\varepsilon=0} = \nabla f_{ij} \cdot P^* \propto -V_{ij} \cdot P^*.$$

Thus $V_{ij} \cdot P^* \geq 0$ for all $i=1,\ldots,4$, $j=1,2$. $V_{31}, V_{41}, V_{32}, V_{42}$ form a square (they are the midpoints of four edges of the tetrahedron). And $(V_{31}+V_{41}+V_{32}+V_{42})/4=0$, hence 0 is in the center of this square. Since $V_{ij} \cdot P^* \geq 0$ for $ij=31, 41, 32, 42$ and $V_{31}=-V_{42}$ and $V_{32}=-V_{41}$, one has $V_{31} \cdot P^* = V_{32} \cdot P^* = 0$. Thus $P^*$ is orthogonal to the plane containing that square, i.e., $P^* \propto \pm V_{12}$. $P^* \propto -V_{12}$ is excluded because $P^* \cdot V_{12} \geq 0$. Thus $P^* \propto V_{12}$.

One finds $f_{31}(0)=0$. By symbolically computing the differentials, one is able to verify that $$\frac{\partial f_{31}(\varepsilon P^*)}{\partial \varepsilon}\bigg|_{\varepsilon=0} \propto \frac{\partial f_{31}(\varepsilon V_{12})}{\partial \varepsilon}\bigg|_{\varepsilon=0} = 0 \text{ and}$$

$$\frac{\partial^2 f_{31}(\varepsilon P^*)}{\partial \varepsilon^2}\bigg|_{\varepsilon=0} \propto \frac{\partial^2 f_{31}(\varepsilon V_{12})}{\partial \varepsilon^2}\bigg|_{\varepsilon=0} = \frac{4}{9} > 0.$$

This implies that $f_{31}(\varepsilon P^*)>0$ for sufficiently small $\varepsilon \in [0,1]$. Hence $\varepsilon P^* \notin E(V_3, V_1, 2)$, in contradiction to $\varepsilon P^* \in P_{space}$ for all $\varepsilon \in [0,1]$. Thus the assumption that $P_{space} \neq \{0\}$ was wrong. By Corollary 5, the PV scheme is sound for $P = P_{space} \times \mathbb{R} = \{0\} \times \mathbb{R}$.

Theorem and Proof Concerning Position Based Authentication

The security of position based authentication methods are now shown by way of a theorem and proof.

Definition 7 (Secure position-based authentication) A position-based authentication (PBA) scheme is a PV scheme where provers and verifiers get an additional argument m, a message to be authenticated.

Let P be a region in spacetime. A position-based authentication (PBA) protocol is sound for P iff for any non-uniform polynomial-time spacetime circuit P* that has no gates in P, the probability that the challenge verifiers (soundness error) accept is negligible in the following execution:

P* picks a message m* and then interacts with honest verifiers (called the challenge verifiers) on input m*. Before, during, and after that interaction, P* may spawn instances of the honest prover and honest verifiers, running on inputs m≠m*. These instances run concurrently with P* and the challenge verifiers and P* may arbitrarily interact with them. Note that the honest prover/honest verifier instances may have gates in P.

Position authentication works in much the same way as position verification except with the following modification: whenever the verifying system or prover queries in $B:=H(x_1 \oplus \ldots \oplus x_r)$, for position based authentication they instead query $B:=H(x_1 \oplus \ldots \oplus x_r \| m)$ instead, where m is the message to be authenticated. Additionally, the verifiers do not start sending the messages $x_i$ or expect $y_1, y_2$ before all $V_i$ get m, and that $V_1^+ \neq V_2^+$ (i.e., $V_1, V_2$ do not send $x_1, x_2$ from the same location in space at the same time, a natural assumption).

Theorem 8 Assume that $\gamma \leq 0.037$ and n,l are superlogarithmic.

Then the PBA protocol described above is sound for $P:= \cap_{i=1}^r C^+(V_i^+) \cap C^-(V_1^-) \cap C^-(V_2^-)$. (In words: There is no event in spacetime outside of P at which one can receive the messages $x_i$ from all $V_i$, and send messages that will be received in time by $V_1, V_2$.)

Concretely, if the malicious prover performs at most q oracle queries, then the soundness error is at most $$\left( 2^{h(\gamma)} \frac{1 + \sqrt{1/2}}{2} \right)^n + 6q 2^{-l/2}.$$

Actually, it is sufficient if the number of queries performed by gates inside $C_1^- \cup C_2^-$ is bounded by q. In particular, oracle queries after both verifiers have received $y_1, y_2$ do not count (as expected).

The main difference to Theorem 4 is that now oracle queries are performed even within P (by the honest provers). Accordingly, one needs to show that these queries do not help the adversary. The main technical challenge is that the message m* is chosen adaptively by the adversary.

The specialized criteria for flat spacetime described previously apply also for the PBA protocol, with identical proofs.

Proof of Theorem 8. A stronger statement is now proven, namely that Theorem 8 holds even if the adversary P* may have gates in P, as long as the adversary does not perform any queries $H(x \| m^*)$ for any $x \in \{0,1\}^l$ where m* is the message picked by the adversary. For this to be well-defined, m* needs to be defined at any oracle query in P. This is the case because by assumption m* must be picked before the verifiers send $x_i$, i.e., $\forall i . V_i \in C^+(E)$ where E is the event where m* is picked. Then $P \subseteq C^+(E)$ by transitivity of $\prec$. Since the concurrently running honest verifiers and provers do not perform such queries, they can be subsumed into P* and it can be assumed that no honest verifiers or provers run, except for the challenge verifiers for m*.

The proof now is similar to that of Theorem 4, and the notation from that proof will be relied upon.

As the adversary's circuit is finite (though arbitrary large), there is a finite upper bound on the length of the inputs to the random oracle. Let $\text{dom}_H$ denote the set of all bitstrings of at most that length. Then it can be assumed that $H: \text{dom}_H \to \{0,1\}^n$. This ensures that the set of possible H does not get uncountable, else one would need to work with non-separable Hilbert spaces. The subcircuits $P_P^*, P_1^*, P_2^*$ are defined as in Theorem 4, but a different definition of $P_{pre}^*$ is used and another subcircuit $P_{pickm}^*$ is added.

| Subcircuit | Region in spacetime | Intuition |
|---|---|---|
| $P_{pickm}^*$ | $((C_1^- \cup C_2^-) \setminus \cap C_i^+) \cap (\cap C^-(V_i^+) \cap C_1^- \cap C_2^-)$ | Picking m* |
| $P_{pre}^*$ | $((C_1^- \cup C_2^-) \setminus \cap C_i^+) \setminus (\cap C^-(V_i^+) \cap C_1^- \cap C_2^-)$ | Precomputation |
| $P_P^*$ | $\cap C_i^+ \cap C_1^- \cap C_2^-$ | Gates in P |
| $P_1^*$ | $\cap C_i^+ \cap C_1^- \setminus C_2^-$ | Computing $y_1$ |
| $P_2^*$ | $\cap C_i^+ \cap C_2^- \setminus C_1^-$ | Computing $y_2$ |
| $P_{post}^*$ | $\Omega \setminus C_1^- \setminus C_2^-$ | After protocol end |

That is, the circuit $P_{pre}^*$ in Theorem 4 has been split into two subcircuits $P_{pre}^*$ and $P_{pickm}^*$. Again, those subcircuits partition the circuit P*.

Using analogous reasoning to that in Theorem 4, the following facts are obtained:

$$P_{pre}^*, P_P^*, P_1^*, P_2^*, P_{post}^* \stackrel{\not\prec}{\to} P_{pickm}^*, \quad P_P^*, P_1^*, P_2^* \stackrel{\not\prec}{\to} P_{pre}^*, \tag{10}$$

$$P_1^*, P_2^* \stackrel{\not\prec}{\to} P_P^*, \quad P_1^* \stackrel{\not\prec}{\to} P_2^*, \quad P_2^* \stackrel{\not\prec}{\to} P_1^*, \quad P_1^* \stackrel{\not\prec}{\to} V_2,$$

$$P_2^* \stackrel{\not\prec}{\to} V_1, \quad P_{post}^* \stackrel{\not\prec}{\to} P_{pre}^*, P_P^*, P_1^*, P_2^*, V_1, V_2.$$

The name $P_{pickm}^*$ will now be justified. Namely it will be shown that the gate G which chooses m* is in $P_{pickm}^*$. Let G be at event E. m* must be chosen before $V_1, \ldots, V_r$ send their values $x_i$ and before $V_1, V_2$ expect the answers $y_1, y_2$. Thus $E \in \cap C^-(V_i^+) \cap C_1^- \cap C_2^-$. Thus immediately one has $G \notin P_{pre}^*, P_{post}^*$. Assume $E \in \cap C_i^+$. Then $E \in C_1^+ \cap C^-(V_1^+)$. By the antisymmetry of $\prec$, one has $C_1^+ \cap C^-(V_1^+) = \{V_1^+\}$. Thus $E = V_1^+$. Analogously $E = V_2^+$. Since $V_1^+ \neq V_2^+$, this cannot be, thus the assumption $E \in \cap C_i^+$ was false. Hence $E \notin \cap C_i^+$ and thus $G \notin P_P^*, P_1^*, P_2^*$. Therefore $G \in P_{pickm}^*$.

Furthermore, at least one of the $x_i$ is not accessed in $P_{pickm}^*$. Assume all $x_i$ are accessed in $P_{pickm}^*$. In particular, $x_1$ is accessed, thus there is a gate G in $P_{pickm}^*$ in $C_1^+$. By the definition of $P_{pickm}^*$, G is in $C^-(V_2^+)$, too. Thus $C^+(V_1^+) \cap C^-(V_2^+) \neq \emptyset$, thus $V_1^+ \prec V_2^+$. Analogously $V_2^+ \prec V_1^+$. By the antisymmetry of $\prec$, $V_1^+ = V_2^+$ in contradiction to $V_1^+ \neq V_2^+$. Hence not all $x_i$ are accessed in $P_{pickm}^*$. For simplicity, assume that it is $x_r$ which is not accessed in $P_{pickm}^*$.

Figure 16:
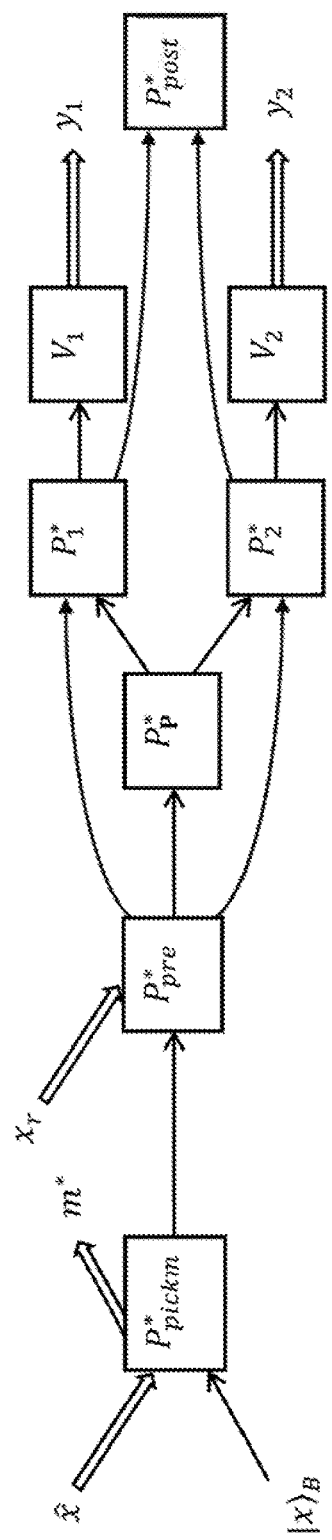
FIG. 16 shows a spacetime circuit.

The execution of a position based authentication protocol can therefore be written as the quantum circuit shown in FIG. 16.

As before, any wires in the transitive hull are omitted. $\vec{x}$ denotes $x_1, \ldots, x_{r-1}$. Note that in contrast to Theorem 4, one cannot omit $P_P^*$ here, since it is not empty.

The original protocol execution can be written as follows:
Game 1 (Protocol execution) Pick $$x_1, \ldots, x_r \xleftarrow{\$} \{0,1\}^\ell, \hat{y} \xleftarrow{\$} \{0,1\}^n, H \xleftarrow{\$} \text{Fun}$$

where Fun is the set of functions $\text{dom}_H \to \{0,1\}^n$. Let $B:=H(x_1 \oplus \ldots \oplus x_r)$. Execute the circuit shown in FIG. 16 until $P_{pickm}^*$ resulting in $m^*$, $y_1$, $y_2$. Let accept:=1 iff $y_1=y_2$ and $\omega(y_1-\hat{y}) \leq \gamma n$.

Game 2 (Using EPR pairs) Pick $$x_1, \ldots, x_r \xleftarrow{\$} \{0,1\}^\ell, H \xleftarrow{\$} \text{Fun}.$$

Figure 17:
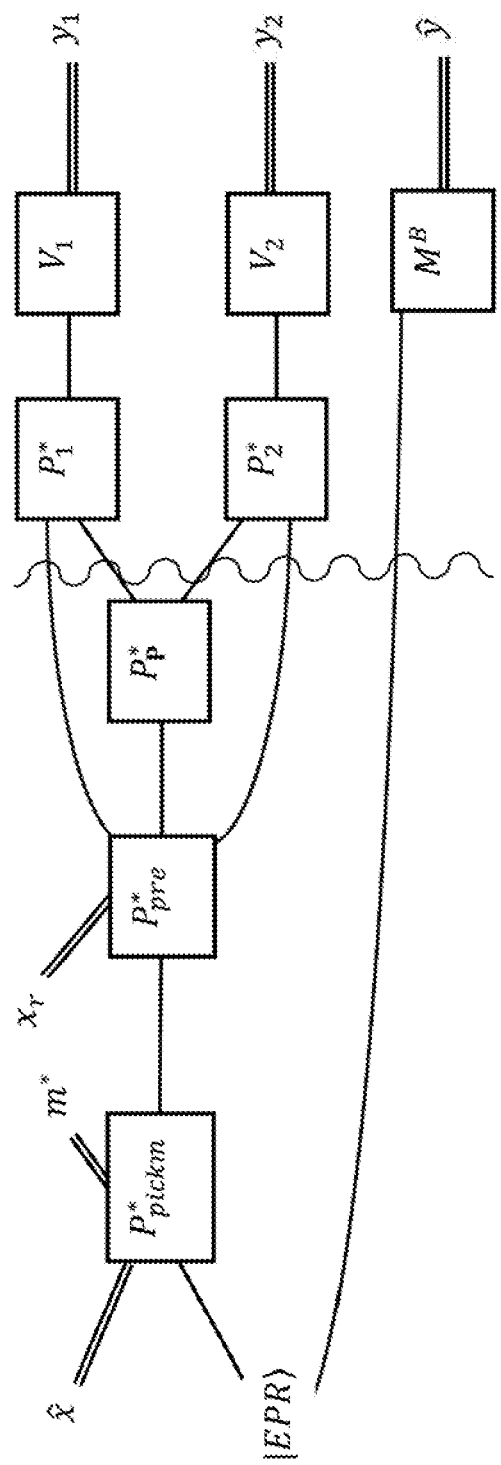
FIG. 17 shows a spacetime circuit.

Execute the circuit shown in FIG. 17 resulting in $m^*$, $\hat{y}$, $y_1$, $y_2$, where $M^B$ uses basis $B:=H(x_1 \oplus \ldots \oplus x_r \| m^*)$.

Let accept:=1 iff $y_1=y_2$ and $\omega(y_1-\hat{y}) \leq \gamma n$.

Exactly as in Theorem 4, Pr[accept=1:Game 1]=Pr[accept=1:Game 2].

In Theorem 4, Lemma 2 was used. In the present setting, Lemma 2 is not sufficient because it does not handle the fact that the adversary adaptively (i.e., depending on the random oracle itself) picks $m^*$ which again determines where the random oracle is reprogrammed. Instead, the stronger Lemma 12, provided further below is used.

Given a function H and values x, m, B, let $H_{xm \to B}$ denote the function identical to H except that $H_{xm \to B}(x\|m)=B$. Let $A_0^H(\,)$ denote the oracle machine that prepares the state $|epr\rangle$, picks $$x_1, \ldots, x_{r-1} \xleftarrow{\$} \{0,1\}^\ell,$$

and then executes $P_{pickm}^*$ and returns $m^*$. Let $A_1^H(x,B)$ denote the oracle machine that, given the state from $A_0^H$, sets $x_r:=x \oplus x_1 \oplus \ldots \oplus x_{r-1}$ and then executes $P_{pre}^*$ and $P_P^*$. Let $A_2^H(x,B)$ denote the oracle machine that, given the state from $A_1^H$, executes $P_1^*$, $P_2^*$, $V_1$, $V_2$, $M^B$ with oracle access to $H_{xm \to H(x\|m)}$ instead of H, sets accept:=1 iff $y_1=y_2$ and $\omega(y_1-\hat{y}) \leq \gamma n$, and returns accept. Let $C_1$, $P_A^1$, $P_A^2$, $P_C$ be defined as in Lemma 12, provided further below. Then by construction, $P_A^1=\text{Pr}[\text{accept}=1:\text{Game 2}]$ (using the fact that $H=H_{xm \to H(x\|m)}$). And $P_A^2=\text{Pr}[\text{accept}=1:\text{Game 3}]$ for the following game:
Game 3 (Reprogramming H) Pick $$x_1, \ldots, x_r \xleftarrow{\$} \{0,1\}^\ell, H \xleftarrow{\$} \text{Fun}.$$

Execute the circuit shown in FIG. 17 until the wiggly line (with oracle access to H). Pick $$B \xleftarrow{\$} \{0,1\}^n.$$

Execute the circuit shown in FIG. 17 after the wiggly line (with oracle access to $H_{xm \to H(x\|m)}$) resulting in $y_1$, $y_2$, $\hat{y}$. Let accept:=1 iff $y_1=y_2$ and $\omega(y_1-\hat{y}) \leq \gamma n$.

And finally $P_C=\text{Pr}[x'=x_1 \oplus \ldots \oplus x_r$ and $m'=m^*:\text{Game 4}]$ for the following game:
Game 4 (Guessing $x_1 \oplus \ldots \oplus x_r$) Pick $$x_1, \ldots, x_r \xleftarrow{\$} \{0,1\}^\ell, H \xleftarrow{\$} \text{Fun}, j \xleftarrow{\$} \{1, \ldots, q\}.$$

Prepare $|epr\rangle$ and execute circuit $m^* \leftarrow P_{pickm}^*$. Execute circuit $P_{pre}^* \cup P_P^*$ until the j-th query to H. Measure the argument $x'\|m'$ of that query.

By Lemma 12, one can see that $|P_A^1-P_A^2| \leq 2q\sqrt{P_C}+q2^{-\ell/2+2}$. Thus, abbreviating "$x=x_1 \oplus \ldots \oplus x_r$ and $m'=m^*$" as guessX, $$|\text{Pr}[\text{accept}=1:\text{Game 2}]-\text{Pr}[\text{accept}=1:\text{Game 3}]| \leq 2q\sqrt{\text{Pr}[\text{guessX}:\text{Game 4}]}+q2^{-\ell/2+2}. \quad (11)$$

Game 3 is now focussed on. Let $\rho_{YLR}$ denote the state in the circuit of FIG. 17 at the wiggly line (for random $x_1, \ldots, x_r$, H). Let L refer to the part of $\rho_{YLR}$ that is on the wires entering $P_1^*$, and R refer to the part of $\rho_{LR}$ on the wires entering $P_2^*$. Let Y refer to the lowest wire (containing EPR qubits). For given B, let $M_L(B)$ be the POVM operating on L consisting of $P_1^*$ and $V_1$. Let $M_R(B)$ be the POVM operating on R consisting of $P_2^*$ and $V_2$. Game 3 can then be written as:
Game 5 (Monogamy game) Prepare $\rho_{YLR}$. Pick $$B \xleftarrow{\$} \{0,1\}^n.$$

Apply measurement $M_L(B)$ to L, resulting in $y_1$. Apply measurement $M_R(B)$ to R, resulting in $y_2$. Measure Y in basis B, resulting in $\hat{y}$. Let accept:=1 iff $y_1=y_2$ and $\omega(y_1-\hat{y}) \leq \gamma n$.

Exactly as in Theorem 4, one can then derive Pr[accept=1:Game 3]=Pr[accept=1:Game 5] using inequality (11):

$$\text{Pr}[\text{accept}=1:\text{Game 1}] \leq \quad (12)$$
$$\left(2^{h(\gamma)}\frac{1+\sqrt{1/2}}{2}\right)^n + 2q\sqrt{\text{Pr}[\text{guessX}:\text{Game 4}]} + q2^{-\ell/2+2}.$$

By assumption, no gate in P queries $H(x\|m^*)$ for any x. Since $P_P^*$ is contained in P, this means no gate in $P_P^*$ queries $H(x\|m^*)$. Thus in Game 4, guessX (which implies $m'=m^*$) can only occur if the j-th gate is not in $P_P^*$. Thus Pr[guessX:Game 4]=Pr[guessX:Game 6]:
Game 6 (Guessing $x_1 \oplus \ldots \oplus x_r$ without $P_P^*$) Pick $$x_1, \ldots, x_r \xleftarrow{\$} \{0,1\}^\ell, H \xleftarrow{\$} \text{Fun}, j \xleftarrow{\$} \{1, \ldots, q\}.$$

Prepare $|epr\rangle$ and execute circuit $m^* \leftarrow P_{pickm}^*$. Execute circuit $P_{pre}^*$ until the j-th query to H. Measure the argument $x'\|m'$ of that query.

$P_{pickm}^* \cup P_{pre}^*$ are contained in $(C_1^- \cup C_2^-) \cap C_i^+$ (like $P_{pre}^*$ was in Theorem 4). Thus, using the same proof as in the analysis of Game 4 in Theorem 4, it can be shown that $\text{Pr}[x'=x_1 \oplus \ldots \oplus x_r:\text{Game 6}] \leq 2^{-\ell}$. Since Pr[guessX:Game 6]$\leq$Pr[$x'=x_1 \oplus \ldots \oplus x_r$:Game 6], with (12) we get $$Pr[\text{accept} = 1 \text{:Game } 1] \leq \left(2^{h(\gamma)}\frac{1+\sqrt{1/2}}{2}\right)^n + 2q2^{-\ell/2} + q2^{-\ell/2+2} = v.$$

As in Theorem 4, $v$ is negligible under the assumptions of the theorem.

Accordingly, Theorem 8 is proven.

Random Oracles

Next, a number of results are derived for working with quantum random oracles. Firstly, a known lemma is restated:

Lemma 9 Let $|\Psi_1\rangle$, $|\Psi_2\rangle$ be quantum states that can be written as $|\Psi_i\rangle = |\Psi_i^*\rangle + |\Phi\rangle$ where both $|\Psi_i^*\rangle$ are orthogonal to $|\Phi^*\rangle$. Then $TD(|\Psi_1\rangle, |\Psi_2\rangle) \leq 2\||\Psi_2^*\rangle\|$.

The next lemma states that it is hard to even decide whether a search problem (given as an oracle) has a solution, even if the claimed solution is provided after the last query to the oracle.

Lemma 10 Let A be an oracle machine making at most q queries. Let $\delta_x(x):=1$ and $\delta_x(y):=0$ for $x \neq y$. Let 0 denote the all-zero function ($0(y)=0$ for all y). Let $\rho_0$ denote the final state of A together with x in the following experiment: Pick $$x \xleftarrow{\$} \{0, 1\}^\ell.$$

Run $A^{\delta_x}(\ )$. Let $\rho_1$ denote the final state state of A together with x in the following experiment: Pick $$x \xleftarrow{\$} \{0, 1\}^n.$$

Run $A^0(\ )$. Then $TD(\rho_0, \rho_1) \leq q2^{-l/2+1}$.

Formally, $\rho_0 = \sum_{x \in \{0,1\}^l} 2^{-l}|x\rangle\langle x| \otimes \rho^x$ where $\rho^x$ is the final state of $A^{\delta_x}(\ )$. And $\rho_1 = \sum_{x \in \{0,1\}^l} 2^{-l}|x\rangle\langle |\otimes \rho'$ where $\rho'$ is the final state of $A^0(\ )$.

Proof. It can be assumed that A uses three quantum registers A, K, V for its state, oracle inputs, and oracle outputs. For a function $f$, let $O_f|a, k, v\rangle = |a, k, v\oplus f(k)\rangle$. Then the final state of $A^f(\ )$ is $(UO_f)^q|\Psi_0\rangle$ for some unitary U and some initial state $|\Psi_0\rangle$.

Let $|\Psi_x^i\rangle := (UO_{\delta_x})^i|\Psi_0\rangle$ and $|\Psi^i\rangle := (UO_0)^i|\Psi_0\rangle = U^i|\Psi_0\rangle$. Then $\rho_0 = \sum_x 2^{-l}|x\rangle\langle x| \otimes |\Psi_x^q\rangle\langle\Psi_x^q|$ and $\rho_1 = \sum_x 2^{-l}|x\rangle\langle x| \otimes |\Psi^q\rangle\langle\Psi^q|$. Abbreviating $TD(|\Psi\rangle\langle\Psi|, |\Phi\rangle\langle\Phi|)$ with $TD(|\Psi\rangle, |\Phi\rangle)$, one obtains:

$$D_i^x := TD(|\Psi_x^i\rangle, |\Psi^i\rangle))$$
$$= TD(O_{\delta_x}|\Psi_x^{i-1}\rangle, |\Psi^{i-1}\rangle))$$
$$\leq TD(O_{\delta_x}|\Psi_x^{i-1}\rangle, O_{\delta_x}|\Psi^{i-1}\rangle) + TD(O_{\delta_x}|\Psi^{i-1}\rangle, |\Psi^{i-1}\rangle))$$
$$= D_{i-1}^x + TD(O_{\delta_x}|\Psi^{i-1}\rangle, |\Psi^{i-1}\rangle)).$$

Furthermore $D_0^x = TD(|\Psi_0\rangle, |\Psi_0\rangle) = 0$, thus $D_q^x \leq \sum_{i=0}^{q-1} TD(O_{\delta_x}|\Psi^i\rangle, |\Psi^i\rangle)$. Accordingly, $$\sum_{x \in \{0,1\}^\ell} 2^{-\ell} TD(|\Psi_x^q\rangle, |\Psi^q\rangle) \leq \sum_{x,i} 2^{-\ell} TD(O_{\delta_x}|\Psi^i\rangle, |\Psi^i\rangle) \leq$$

$$\sum_{x,i} 2^{-\ell} TD(O_{\delta_x} Q_x|\Psi^i\rangle + (1-Q_x)|\Psi^i\rangle, Q_x|\Psi^i\rangle + (1-Q_x)|\Psi^i\rangle) \overset{(*)}{\leq}$$

$$\sum_{x,i} 2^{-\ell} 2\|Q_x|\Psi^i\rangle\| \overset{(**)}{\leq} 2\sum_i \sqrt{\sum_x 2^{-\ell}\|Q_x|\Psi^i\rangle\|^2} =$$

$$2\sum_i \sqrt{2^{-\ell} \cdot 1} = q2^{-\ell/2+1}$$

where $Q_x$ is a projector projecting K onto $|x\rangle$ (i.e., $Q_x = I \otimes |x\rangle\langle x \otimes I$). And (*) uses Lemma 9. And (**) uses Jensen's inequality. Finally, $$TD(\rho_0, \rho_1) = TD\left(\sum_x 2^{-\ell}|x\rangle\langle x| \otimes |\Psi_x^q\rangle\langle\Psi_x^q|, \sum_x 2^{-\ell}|x\rangle\langle x| \otimes |\Psi^q\rangle\langle\Psi^q|\right)$$
$$= \sum_x 2^{-\ell} TD(|\Psi_x^q\rangle, |\Psi^q\rangle) \leq q2^{-\ell/2+1}.$$

□

Another lemma is provided.

Lemma 11 (One-way to hiding, adaptive) Let $H:\{0,1\}^* \to \{0,1\}^n$ be a random oracle. Consider an oracle algorithm $A_0$ that makes at most $q_0$ queries to H. Consider an oracle algorithm $A_1$ that uses the final state of $A_0$ and makes at most $q_1$ queries to H. Let $C_1$ be an oracle algorithm that on input (j, B, x) does the following: run $A_1^H(x, B)$ until (just before) the j-th query, measure the argument of the query in the computational basis, output the measurement outcome. (When A makes less than j queries, $C_1$ outputs $\perp \notin \{0,1\}^l$.)

Let $$P_A^1 := Pr[b' = 1 : H \xleftarrow{\$} (\{0, 1\}^* \to \{0, 1\}^n),$$
$$m \xleftarrow{\$} A_0^H(\ ), x \leftarrow \{0, 1\}^\ell, b' \leftarrow A_1^H(x, H(x\|m))]$$

$$P_A^2 := Pr[b' = 1 : H \xleftarrow{\$} (\{0, 1\}^* \to \{0, 1\}^n), m \xleftarrow{\$} A_0^H(\ ),$$
$$x \leftarrow \{0, 1\}^\ell, B \xleftarrow{\$} \{0, 1\}^n, b' \leftarrow A_1^H(x, B)]$$

$$P_C := Pr[x = x' \wedge m = m' : H \xleftarrow{\$} (\{0, 1\}^* \to \{0, 1\}^n), m \xleftarrow{\$} A_0^H(\ ),$$
$$x \leftarrow \{0, 1\}^\ell, B \xleftarrow{\$} \{0, 1\}^n, j \xleftarrow{\$} \{1, \ldots, q_1\}, x'\|m' \leftarrow C_1^H(j, B, x)]$$

Then $|P_A^1 - P_A^2| \leq 2q_1\sqrt{P_C} + q_0 2^{-\ell/2+2}$.

Proof. One can assume the domain of H to be a finite (but large) set $\text{dom}_H$ to avoid dealing with non-separable Hilbert spaces.

First rewrite the probability $P_A^1$:

$$P_A^1 =$$
$$Pr[b' = 1 : H \xleftarrow{\$} (\text{dom}_H \to \{0, 1\}^n), x \leftarrow \{0, 1\}^\ell, m \xleftarrow{\$} A_0^H(\ ), B \xleftarrow{\$} \{0, 1\}^n,$$
$$b' \leftarrow A_1^H(x, H(x\|m))] \overset{\varepsilon}{\approx} Pr[b' = 1 : H \xleftarrow{\$} (\text{dom}_H \to \{0, 1\}^n), x \leftarrow \{0, 1\}^\ell,$$
$$m \xleftarrow{\$} A_0^{H_x}(\ ), B \xleftarrow{\$} \{0, 1\}^n,$$
$$b' \leftarrow A_1^H(x, H(x\|m))] \overset{(*)}{\approx} Pr[b' = 1 : H \xleftarrow{\$} (\text{dom}_H \to \{0, 1\}^n),$$
$$x \leftarrow \{0, 1\}^\ell, m \xleftarrow{\$} A_0^{H_x}(\ ), B \xleftarrow{\$} \{0, 1\}^n, b' \leftarrow A_1^{H_{xm \to B}}(x, B)] \overset{\varepsilon}{\approx}$$

-continued $$Pr[b' = 1 : H \xleftarrow{\$} (dom_H \to \{0,1\}^n), x \leftarrow \{0,1\}^\ell,$$
$$m \xleftarrow{\$} A_0^H(), B \xleftarrow{\$} \{0,1\}^n, b' \leftarrow A_1^{H_{xm \to B}}(x,B)] =: \hat{P}_A^1$$

Here $H_{\backslash x}$ denotes the function identical to H, except that $H_{\backslash x}(x\|\hat{m}):=0$ for all $\hat{m}$. And $a \stackrel{\varepsilon}{\approx} b$ means that $|a-b|\leq \varepsilon := q_0 2^{-l/2+1}$. Here (*) uses the fact that $H_{xm \to B}$ and H are identically distributed for an adversary that did not query $H(x\|\hat{m})$ for any $\hat{m}$. And the first $\stackrel{\varepsilon}{\approx}$ is shown by reduction to Lemma 10: Let $A^f()$ be the algorithm that picks $$H \xleftarrow{\$} (dom_H \to \{0,1\}^n)$$

and then runs $$m \xleftarrow{\$} A_0^{H'}$$

( ) where $H'(\hat{x}\|\hat{m}) := H(\hat{x}\|\hat{m})$ if $f(\hat{x})=0$ and $H'(\hat{x}\|\hat{m}):=0$ otherwise. $A^f$ performs at most $q_0$ queries to $f$. Then for uniform $x \in \{0,1\}^l$, the final state of $A^0()$ together with x is the state of the game on the left hand side of $\stackrel{\varepsilon}{\approx}$ before choosing B, and the final state of $A^{\delta_x}()$ together with x is the state of the game on the right hand side before choosing B. By Lemma 10, those two states have trace distance at most $\varepsilon = q_0 2^{-l/2+1}$. Thus the probabilities on the left hand side and right hand side of the first $\stackrel{\varepsilon}{\approx}$ have distance at most $\varepsilon$, as claimed. The second $\stackrel{\varepsilon}{\approx}$ is shown in the same way. Thus $$|P_A^1 - \hat{P}_A^1| \leq 2\varepsilon = q_0 2^{-l/2+2}. \quad (13)$$

One proceeds to bound $|\hat{P}_A^1 - P_A^2|$. It is assumed without loss of generality that $A_0, A_1$ perform only unitary operations (except for a final projective measurement that returns their classical output). For a given B,H, let $|\Phi_{HBm}\rangle$ denote the final state of $A_0^H(B)$, conditioned on classical output m. Let $\alpha_{HBm}$ be the probability that $A_0^H(B)$ outputs m.

Assume that $A_1$ uses three quantum registers A, K, V for its state, oracle inputs, and oracle outputs. The initial state of $A_1$ is the final state $|\Phi_{HBm}\rangle$ of $A_0^H(B)$. For an oracle H, let $O_H|a,k,v\rangle := |a, k, v\oplus H(k)\rangle$. Let U denote the unitary transformation applied by $A_1^H$ between queries to H. Let $U_{xB}$ be an initial unitary transformation that depends on the inputs $(x,B)$ of $A_1^H$. Then the final state of $A_1^H(x,B)$ running after $m \leftarrow A_0^H(B)$ is $|\Psi_{HBmx}^{q1}\rangle$ with $|\Psi_{HBmx}^{i}\rangle := (UO_H)^i U_{xB}|\Phi_{HBm}\rangle$. And the final state of $A_1^{H_{xm \to B}}(x,B)$ running after $m \leftarrow A_0^H(B)$ is $|\tilde{\Psi}_{HBmx}^{q1}\rangle$ with $|\tilde{\Psi}_{HBmx}^{i}\rangle := (UO_{H_{xm \to B}})^i U_{xB}|\Phi_{HBm}\rangle$. (Note: in the last sentence, $A_0^H$ is used, not $A_0^{H_{xm \to B}}$.)

Thus $$|\hat{P}_A^1 - P_A^2| \leq \quad (14)$$
$$TD\left(\sum_{H,B,x,m} \beta \alpha_{HBm}|\Psi_{HBmx}^{q1}\rangle\langle\Psi_{HBmx}^{q1}|, \sum_{H,B,x,m} \beta \alpha_{HBm}|\tilde{\Psi}_{HBmx}^{q1}\rangle\langle\tilde{\Psi}_{HBmx}^{q1}|\right)$$

where $\beta := 2^{-n|dom_H|} \cdot 2^{-n} \cdot 2^{-l}$ is the probability of each tuple (H, B, x).

In order to bound the right hand side of (14), first bound $TD(|\Psi_{HBmx}^{q1}\rangle, |\tilde{\Psi}_{HBmx}^{q1}\rangle)$. (Here $TD(|\Psi\rangle, |\Phi\rangle)$ abbreviates $TD(|\Psi\rangle\langle\Psi|, |\Phi\rangle\langle\Phi|)$.) For this, fix H, B, m, x and omit those values from the indices until further notice. Let $D_j := TD(|\Psi^j\rangle, |\tilde{\Psi}^j\rangle)$. Then $D_0 = TD(U_{xB}|\Phi_{HBm}\rangle, U_{xB}|\Phi_{HBm}\rangle) = 0$.

Let $V|a, k, v\rangle := |a, k, v \oplus B\rangle$, and let $Q_{xm}$ project K onto $|x\|m\rangle$. (Formally, $Q_{xm} = I \otimes |x\|m\rangle\langle x\|m| \otimes I$.) Then $O_{H_{xm \to B}} = VQ_{xm} + O_H(1-Q_{xm})$. (This is easily verified on basis vectors $|a, k, v\rangle$.) Then for $j \geq 1$, $$D_j = TD(UO_H|\Psi^{j-1}\rangle, UO_{H_{xm\to B}}|\tilde{\Psi}^{j-1}\rangle)$$
$$= TD(O_H|\Psi^{j-1}\rangle, O_{H_{xm\to B}}|\tilde{\Psi}^{j-1}\rangle) \leq TD(O_H|\Psi^{j-1}\rangle, O_{H_{xm\to B}}|\Psi^{j-1}\rangle) +$$
$$TD(O_{H_{xm\to B}}|\Psi^{j-1}\rangle, O_{H_{xm\to B}}|\tilde{\Psi}^{j-1}\rangle)$$
$$= TD(O_H|\Psi^{j-1}\rangle, O_{H_{xm\to B}}|\Psi^{j-1}\rangle) + D_{j-1}$$
$$= TD(O_H Q_{xm}|\Psi^{j-1}\rangle + O_H(1-Q_{xm})|\Psi^{j-1}\rangle, VQ_{xm}|\Psi^{j-1}\rangle +$$
$$O_H(1-Q_{xm})|\Psi^{j-1}\rangle) + D_{j-1} \stackrel{(*)}{\leq} 2\|VQ_{xm}|\Psi^{j-1}\rangle\| + D_{j-1} \leq$$
$$2\|Q_{xm}|\Psi^{j-1}\rangle\| + D_{j-1}.$$

Here (*) uses Lemma 9. (Lemma 9 can be applied because $O_H(1-Q_{xm})|\Psi^{j-1}\rangle$ is in the image of $(1-Q_{xm})$ while $O_H Q_{xm}|\Psi^{j-1}\rangle$ and $VQ_{xm}|\Psi^{j-1}\rangle$ are in the image of $Q_{xm}$ which is orthogonal to that of $(1-Q_{xm})$.)

Thus $$TD(|\Psi_{HBm}^{q1}\rangle, |\tilde{\Psi}_{HBmx}^{q1}\rangle) = D_{q1} \leq \sum_{j=1}^{q_1} 2\|Q_{xm}|\Psi^{j-1}\rangle\|. \quad (15)$$

From now on, again write the indices H, B, m, x. One then obtains $$|\hat{P}_A^1 - P_A^2| \stackrel{(14),(*)}{\leq} \sum_{H,B,x,m} \beta \alpha_{HBm} TD(|\Psi_{HBmx}^{q1}\rangle, |\tilde{\Psi}_{HBmx}^{q1}\rangle) \stackrel{(15)}{\leq} \quad (16)$$
$$2q_1 \sum_{H,B,x,m} \sum_{j=1}^{q_1} \frac{\beta \alpha_{HBm}}{q_1} \|Q_{xm}|\Psi_{HBmx}^{j-1}\rangle\| \stackrel{(**)}{\leq}$$
$$2q_1 \sqrt{\sum_{H,B,x,m} \sum_{j=1}^{q_1} \frac{\beta \alpha_{HBm}}{q_1} \|Q_{xm}|\Psi_{HBmx}^{j-1}\rangle\|^2}$$

Here (*) uses the convexity of the trace distance and (**) uses Jensen's inequality.

When starting with the final state $|\Phi_{HBm}\rangle$ from $m \leftarrow A_0^H(B)$, the final state of $C_1^H(j, B, x)$ is $|\Psi_{HBmx}^{j-1}\rangle$ by definition of $C_1$. Thus the probability that $C_1(j, B, x)$ outputs a given value $x'\|m'$ is $\|Q_{x'm'}|\Psi_{HBmx}^{j-1}\rangle\|$. Thus $$P_C = \sum_{H,B,x,m} \sum_{j=1}^{q_1} \frac{\beta \alpha_{HBm}}{q_1} \|Q_{xm}|\Psi_{HBmx}^{j-1}\rangle\|^2.$$

With (16) one gets $|\hat{P}_A^1 - P_A^2| \leq 2q_1 \sqrt{P_C}$ and hence $$|P_A^1 - P_A^2| \leq |\hat{P}_A^1 - P_A^2| + |P_A^1 - \hat{P}_A^1| \stackrel{(13)}{\leq} 2q_1 \sqrt{P_C} + q_0 2^{-l/2+2}.$$

The following lemma is a general case of the random oracle programming lemma, Lemma 2. The lemma here additionally allows the adversary to adaptively select the part of the domain of the random oracle in which the reprogramming will take place.

Lemma 12 (Random oracle programming, adaptive) Let $H:\{0,1\}^* \to \{0,1\}^n$ be a random oracle. Let $(A_0, A_1, A_2)$ be oracle algorithms such that $A_0$ performs at most $q_0$ queries, and $A_1, A_2$ together perform at most $q_{12}$ queries to H. Let $C_1$ be an oracle algorithm that on input (j, B, x) does the following: Run $A_1^H(x,B)$ till the j-th query to H, then measure the argument of that query in the computational basis, and output the measurement outcome. (Or $\perp$ if no j-th query occurs.) Let $$P_A^1 := Pr[b' = 1 : H \xleftarrow{\$} (\{0,1\}^* \to \{0,1\}^n), m \xleftarrow{\$} A_0^H(),$$
$$x \xleftarrow{\$} \{0,1\}^\ell, A_1^H(x, H(x\|m)), b' \leftarrow A_2^H(x, H(x\|m))]$$

$$P_A^2 := Pr[b' = 1 : H \xleftarrow{\$} (\{0,1\}^* \to \{0,1\}^n), m \xleftarrow{\$} A_0^H(), x \xleftarrow{\$} \{0,1\}^\ell,$$
$$B \xleftarrow{\$} \{0,1\}^n, A_1^H(x, B), H(x\|m)) := B, b' \leftarrow A_2^H(x, B)]$$

$$P_C := Pr[x = x' \wedge m = m' : H \xleftarrow{\$} (\{0,1\}^* \to \{0,1\}^n), m \xleftarrow{\$} A_0^H(),$$
$$x \xleftarrow{\$} \{0,1\}^\ell, B \xleftarrow{\$} \{0,1\}^n, j \xleftarrow{\$} \{1, \ldots, q_{12}\}, x'\|m' \leftarrow C_1^H(j, B, x)]$$

Then $|P_A^1 - P_A^2| \leq 2q_{12}\sqrt{P_C} + q_0 2^{-\ell/2+2}$.

Proof. Lemma 11 will be used to prove Lemma 12. To keep the variable names apart, all variables from Lemma 11 are decorated with an overline. For example, $\overline{A}_1^H$, $\overline{q}_0$, $\overline{P}_A^1$ instead of $A_1^H$, $q_0$, $P_A^1$.

Let $\overline{A}_0^H() := A_0^H()$, $\overline{q}_0 := q_0$, $\overline{q}_1 := q_{12}$. The algorithm $\overline{A}_1^H$, upon input (x,B), runs $A_1^H(x,B)$, then runs $b' \leftarrow A_2^{H_{xm \mapsto B}}(x, B)$, and returns b'. Here $H_{xm \mapsto B}$ denotes the function identical to H, except that $H_{xm \mapsto B}(x\|m) = B$.

One finds $$P_A^1 = Pr[b' = 1 : H \xleftarrow{\$} (\{0,1\}^* \to \{0,1\}^n), m \xleftarrow{\$} A_0^H(), \xleftarrow{\$} \{0,1\}^\ell,$$
$$A_1^H(x, H(x\|m)), b' \leftarrow A_2^H(x, H(x\|m))]$$
$$\stackrel{(*)}{=} Pr[b' = 1 : H \xleftarrow{\$} (\{0,1\}^* \to \{0,1\}^n), m \xleftarrow{\$} A_0^H(), m \xleftarrow{\$} \{0,1\}^\ell,$$
$$A_1^H(x, H(x\|m)), b' \leftarrow A_2^{H_{xm \mapsto H(x\|m)}}(x, H(x\|m))]$$
$$= Pr[b' = 1 : H \xleftarrow{\$} (\{0,1\}^* \to \{0,1\}^n), m \xleftarrow{\$} \overline{A}_0^H(), x \xleftarrow{\$} \{0,1\}^\ell,$$
$$b' \leftarrow \overline{A}_1^H(x, H(x\|m))] = \overline{P}_A^1.$$

Here (*) follows from the fact that H and $H_{xm \mapsto H(x\|m)}$ are identical functions. Similarly, one obtains $P_A^2 = \overline{P}_A^2$.

Furthermore, $$P_C = Pr[x = x' \wedge m = m' : H \xleftarrow{\$} (\{0,1\}^* \to \{0,1\}^n),$$
$$m \xleftarrow{\$} A_0^H(), x \xleftarrow{\$} \{0,1\}^n, B \xleftarrow{\$} \{0,1\}^n, j \xleftarrow{\$} \{1, \ldots, q_{12}\},$$
$$x'\|m' \leftarrow C_1^H(j, B, x)] \stackrel{(*)}{\leq} Pr[x = x' \wedge m = m' : H \xleftarrow{\$} (\{0,1\}^* \to \{0,1\}^n),$$
$$m \xleftarrow{\$} A_0^H(), x \xleftarrow{\$} \{0,1\}^n, B \xleftarrow{\$} \{0,1\}^n, j \xleftarrow{\$} \{1, \ldots, q_{12}\},$$
$$x'\|m' \leftarrow \overline{C}_1^H(j, B, x)] = Pr[x = x' \wedge m = m' : H \xleftarrow{\$} (\{0,1\}^* \to \{0,1\}^n),$$
$$m \xleftarrow{\$} \overline{A}_0^H(), x \xleftarrow{\$} \{0,1\}^n, B \xleftarrow{\$} \{0,1\}^n,$$
$$j \xleftarrow{\$} \{1, \ldots, \overline{q}_1\}, x'\|m' \leftarrow \overline{C}_1^H(j, B, x)] = \overline{P}_C.$$

For (*), note that $C_1^H$ by definition simulates $A_1^H$, aborting at the j-th query. While $\overline{C}_1^H$ simulates $A_1^H$ followed by $A_2^{H_{xm \mapsto B}}$, aborting at the j-th query. Thus $\overline{C}_1^H$ is at least as likely to return the correct x', m' as $C_1^H$. The latter will return $x' = H_{x \mapsto B}$ when the j-th query would be made by $A_2^{H_{xm \mapsto B}}$.

Hence $$|P_A^1 - P_A^2| = |\overline{P}_A^1 - \overline{P}_A^2| \stackrel{(*)}{\leq} 2\overline{q}_1\sqrt{\overline{P}_C} + \overline{q}_0 2^{-\ell/2+2} \leq 2q_{12}\sqrt{P_C} + q_0 2^{-\ell/2+2}.$$

Here (*) uses Lemma 11.

The invention claimed is:

1. A method for a verifying system to verify a location of a target apparatus, the method comprising:
   transmitting a plurality of signals from two or more of a plurality of communication devices of the verifying system to the target apparatus, each signal of the plurality of signals comprising information;
   sending quantum information to the target apparatus via a quantum communication channel, wherein a plurality of bits is encoded in the quantum information and the encoding of the plurality of bits is based on an output of a function of the information associated with the plurality of signals;
   receiving a response related to the plurality of bits at two or more of the plurality of communication devices;
   analysing the response, the plurality of bits encoded in the quantum information, and a time between the transmitting of the plurality of signals and the receiving of the response; and
   determining from the analysing whether or not the response originated from the location of the target apparatus,
   wherein the function is a composition of functions, and wherein the composition contains, as a first component, a linear function and as a second component a non-linear function, so that the image of the linear function is the argument of the non-linear function.

2. A method according to claim 1, wherein the plurality of signals are transmitted such that each signal arrives at the location of the target apparatus within a time frame.

3. A method according to claim 2, wherein the time frame is an instant in time.

4. A method according to claim 1, wherein the transmitting of the plurality of signals from the two or more communication devices of the verifying system to the target apparatus comprises, at each of the two or more communication devices, transmitting a signal of the plurality of signals to the target apparatus, and wherein the information associated with the signal is distinct from information associated with a signal of the plurality of signals transmitted from another communication device of the two or more communication devices.

5. A method according to claim 1, wherein the information associated with the plurality of signals is classical information.

6. A method according to claim 1, wherein the sending of quantum information to the target apparatus comprises sending to the target apparatus, via the quantum communication channel, a plurality of quantum objects, wherein the plurality of bits is encoded in quantum states of the quantum objects.

7. A method according to claim 1, wherein the quantum communication channel comprises a quantum teleportation channel.

8. A method according to claim 1, wherein the quantum communication channel is associated with one or more of the plurality of communication devices.

9. A method according to claim 1, wherein the function is a non-linear function.

10. A method according to claim 9, wherein the function is a cryptographic hash function.

11. A method according to claim 1, wherein the non-linear function in the composition is a cryptographic hash function.

12. A method according to claim 11, wherein the linear function in the composition is a bitwise XOR of its arguments.

13. A method according to claim 1, wherein the output of the function of the information associated with the plurality of signals indicates a basis of measurement for measuring a quantum object.

14. A method according to claim 13, wherein the basis of measurement is a basis for measuring a polarization state of a photon.

15. A method according to claim 1, wherein the receiving a response related to the plurality of bits comprises receiving the plurality of bits.

16. A method according to claim 1, wherein the analysing of a time between the transmitting of the plurality of signals and the receiving of the response comprises checking that the time is less than a bound.

17. A verifying system for verifying a location of a target apparatus, the verifying system comprising:
   a plurality of communication devices configured to transmit a plurality of signals to the target apparatus and configured to receive a response;
   a quantum state transmitter for sending quantum information to the target apparatus via a quantum communication channel; and
   a controller configured to perform a method according to claim 1.

18. A method for a target apparatus to prove its location to a verifying system, the method comprising:
   receiving at the target apparatus, from the verifying system, a plurality of signals, each signal of the plurality of signals comprising information;
   receiving quantum information from the verifying system via a quantum communication channel, wherein a plurality of bits is encoded in the quantum information;
   determining at least a part of the encoding of the encoded plurality of bits based on an output of a function of the information associated with the plurality of signals;
   decoding a plurality of bits from the quantum information in accordance with the
   encoding of the encoded plurality of bits; and
   sending a response related to the decoded plurality of bits to two or more of a plurality of communication devices of the verifying system,
      wherein the function is a composition of functions, and
      wherein the composition contains, as a first component, a linear function and as a second component a non-linear function, so that the image of the linear function is the argument of the non-linear function.

* * * * *